(12) United States Patent
Taufik et al.

(10) Patent No.: US 7,782,032 B2
(45) Date of Patent: Aug. 24, 2010

(54) SYSTEM METHOD AND APPARATUS FOR A MULTI-PHASE DC-TO-DC CONVERTER

(75) Inventors: Taufik, San Luis Obispo, CA (US); Dodi Garinto, Solo (ID); Ian O. Waters, San Luis Obispo, CA (US); Kay K. Ohn, San Luis Obispo, CA (US)

(73) Assignee: California Polytechnic Corporation, San Luis Obispo, CA (US)

( * ) Notice: Subject to any disclaimer, the term of this patent is extended or adjusted under 35 U.S.C. 154(b) by 132 days.

(21) Appl. No.: 12/235,597

(22) Filed: Sep. 22, 2008

(65) Prior Publication Data

US 2009/0140706 A1 Jun. 4, 2009

Related U.S. Application Data

(60) Provisional application No. 60/992,076, filed on Dec. 3, 2007.

(51) Int. Cl.
G05F 1/00 (2006.01)
(52) U.S. Cl. .................... 323/272; 323/284; 363/65; 363/69
(58) Field of Classification Search .................. 323/237, 323/244, 271, 272, 282, 284; 363/65, 69
See application file for complete search history.

(56) References Cited

U.S. PATENT DOCUMENTS 5,097,196 A * 3/1992 Schoneman ................ 323/222
6,184,666 B1 * 2/2001 Boeckmann et al. ........ 323/282
6,462,520 B1 * 10/2002 Mangtani et al. ............ 323/271
6,703,812 B1 * 3/2004 Lethellier .................... 323/222
2009/0085536 A1 * 4/2009 Qahouq et al. .............. 323/272

* cited by examiner

Primary Examiner—Jessica Han
Assistant Examiner—Jeffrey Gblende
(74) Attorney, Agent, or Firm—Martine Penilla & Gencarella, LLP

(57) ABSTRACT

A multiphase buck DC to DC converter with an input-output LC tank. The multiphase buck DC to DC converter with an input-output LC tank includes multiple synchronous buck DC to DC converter cells. Each one of the synchronous buck DC to DC converter cells having an input node, an output node and a control node. The synchronous buck DC to DC converter cells are arranged in a parallel configuration including having the input nodes of each one of the synchronous buck DC to DC converter cells connected together at a common input node. The synchronous buck DC to DC converter cells are also arranged in pairs of synchronous buck DC to DC converter cells. The output nodes of each one of the pairs of the synchronous buck DC to DC converter cells are connected to corresponding pair output node. Each one of the pairs of the synchronous buck DC to DC converter cells include a capacitor connected between the common input node and the corresponding pair output node and a corresponding output inductor connected between the corresponding pair output node and a common output node. Methods of reducing a DC input voltage are also disclosed. A multiphase buck DC to DC converter with a bypass capacitor is also disclosed.

11 Claims, 12 Drawing Sheets

SYSTEM METHOD AND APPARATUS FOR A MULTI-PHASE DC-TO-DC CONVERTER

CROSS REFERENCE TO RELATED APPLICATIONS

This application claims priority from U.S. Provisional Patent Application No. 60/992,076 filed on Dec. 3, 2007 and entitled "System Method and Apparatus for a Multi-Phase DC-to-DC Converter," which is incorporated herein by reference in its entirety.

BACKGROUND

The present invention relates generally to DC to DC converters, and more particularly, to methods and systems for multi-phase DC to DC conversion.

As microprocessor transistor density increases following Moore's Law, concern grows in the semiconductor industry for powering CPUs reliably and efficiently. Moore's law, surmised by Intel's co-founder Gordon Moore in 1965, predicts that the number of transistors in a single processor will double approximately every two years ("Moore's Law." par. 4). Intel's latest Dual Core Itanium 2 processor has over one billion transistors.

Powering these processors requires a power supply capable of producing high current output at relatively low voltages. By way of example, the Dual Core Itanium 2 processor requires 1.0875 volts DC to 1.25 volts DC from the power supply with a maximum current input of 121 amperes and a maximum total power of about 177 W.

Further, the International Technology Roadmap for Semiconductors (ITRS) produced by the Semiconductor Industry association (SIA) predicts that microprocessors will operate at 0.6 volts DC and 300 amperes by the year 2010. As a result, computer power supplies must evolve to meet the future demands of future microprocessors.

The typical computer power rail of the system board provides 12 volts DC. The 12 volts DC rail voltage is then converted to the specified processor voltage without incurring a large power loss within the converter circuitry. Therefore, DC-to-DC converters have become the norm for powering microprocessors. However, as processor voltage ratings decrease and current ratings increase, the challenge to produce a converter that will supply the proper power, without sacrificing efficiency and output quality, becomes more difficult.

In view of the foregoing, there is a need for an improved multi-phase DC-to-DC converter circuit aimed at improving the delivery of power to a microprocessor. Such an improved multi-phase DC-to-DC converter circuit topology will improve the output voltage and current characteristics while also improving overall converter efficiency.

SUMMARY

Broadly speaking, the present invention fills these needs by providing an improved system, method and apparatus for multi-phase DC-to-DC conversion. It should be appreciated that the present invention can be implemented in numerous ways, including as a process, an apparatus, a system, computer readable media, or a device. Several inventive embodiments of the present invention are described below.

One embodiment provides a multiphase buck DC to DC converter with an LC tank filter. The multiphase buck DC to DC converter includes multiple synchronous buck DC to DC converter cells. Each one of the synchronous buck DC to DC converter cells having an input node, an output node and a control node. The synchronous buck DC to DC converter cells are arranged in a parallel configuration including having the input nodes of each one of the synchronous buck DC to DC converter cells connected together at a common input node. The synchronous buck DC to DC converter cells are also arranged in pairs of synchronous buck DC to DC converter cells. The output nodes of each one of the pairs of the synchronous buck DC to DC converter cells are connected to corresponding pair output node. Each one of the pairs of the synchronous buck DC to DC converter cells include a capacitor connected between the common input node and the corresponding pair output node and a corresponding output inductor connected between the corresponding pair output node and a common output node.

Each one of the synchronous buck DC to DC converter cells can include an input switch having a first voltage source input node, an input switch control node and an input switch output node. Each one of the synchronous buck DC to DC converter cells can also include a converter cell inductor having a first end and a second end, wherein the first end of the converter cell inductor is connected to the input switch output node and the second end of the converter cell inductor is connected to the output nodes of the synchronous buck DC to DC converter cell. A second switch having a second voltage source input node, a second switch control node and a second switch output node, the second switch output node connected to the input switch output node, the input switch output node and the second switch control node coupled to a corresponding control input of the synchronous buck DC to DC converter cell.

The multiphase buck DC to DC converter can also include a controller having a corresponding one of a plurality of control outputs coupled to a corresponding control input of each of the plurality of synchronous buck DC to DC converter cells. The controller can include logic for sequentially activating each one of the synchronous buck DC to DC converter cells. The controller can also include a feedback signal input from the output of the multiphase buck DC to DC converter.

Another embodiment provides a method of reducing a DC input voltage. The method includes applying the DC input voltage to a common input node of a multiphase buck DC to DC converter including multiple synchronous buck DC to DC converter cells. Each one of the synchronous buck DC to DC converter cells having an input node, an output node and a control node. The synchronous buck DC to DC converter cells are arranged in a parallel configuration including having the input nodes of each one of the synchronous buck DC to DC converter cells connected together at a common input node. The synchronous buck DC to DC converter cells are also arranged in pairs of synchronous buck DC to DC converter cells. The output nodes of each one of the pairs of the synchronous buck DC to DC converter cells are connected to corresponding pair output node. Each one of the pairs of the synchronous buck DC to DC converter cells include a capacitor connected between the common input node and the corresponding pair output node and a corresponding output inductor connected between the corresponding pair output node and a common output node. The method further includes filtering an output of each one of the synchronous buck DC to DC converter cells in an LC tank formed by the corresponding output inductor and the capacitor connected between the common input node and the corresponding pair output node. The outputs of each one of the plurality synchronous buck DC to DC converter cells are combined at the common output node.

Another embodiment provides a multiphase buck DC to DC converter with a bypass filter. The multiphase buck DC to DC converter with a bypass filter includes multiple synchronous buck DC to DC converter cells. Each one of the synchronous buck DC to DC converter cells having an input node, a converter cell output node and a control node. The synchronous buck DC to DC converter cells being arranged in a parallel configuration including having the input nodes of each one of the synchronous buck DC to DC converter cells connected together at a common input node. The synchronous buck DC to DC converter cells are arranged in pairs of synchronous buck DC to DC converter cells wherein the output nodes of each one of the pairs of the synchronous buck DC to DC converter cells are connected to corresponding pair output node. Each one of the synchronous buck DC to DC converter cells include a bypass inductor coupled between the corresponding pair output nodes and a corresponding bypass node. A bypass capacitor is connected between the common input node and the corresponding bypass nodes. An auxiliary inductor is coupled between the corresponding bypass node and a common output node.

Each one of the plurality of pairs of synchronous buck DC to DC converter cells can also include an additional inductor coupled between the second switch and a ground potential and an additional capacitor coupled between the second switch and the corresponding pair output node.

The multiphase buck DC to DC converter can also include a controller having a corresponding one of a plurality of control outputs coupled to a corresponding control input of each of the synchronous buck DC to DC converter cells. The controller includes logic for sequentially activating each one of the synchronous buck DC to DC converter cells.

Yet another embodiment provides a method of reducing a DC input voltage. The method includes applying the DC input voltage to a common input node of a multiphase buck DC to DC converter. The multiphase buck DC to DC converter includes multiple synchronous buck DC to DC converter cells. Each one of the synchronous buck DC to DC converter cells having an input node, a converter cell output node and a control node. The synchronous buck DC to DC converter cells being arranged in a parallel configuration including having the input nodes of each one of the synchronous buck DC to DC converter cells connected together at a common input node. The synchronous buck DC to DC converter cells are arranged in pairs of synchronous buck DC to DC converter cells wherein the output nodes of each one of the pairs of the synchronous buck DC to DC converter cells are connected to corresponding pair output node. Each one of the synchronous buck DC to DC converter cells include a bypass inductor coupled between the corresponding pair output nodes and a corresponding bypass node. A bypass capacitor is connected between the common input node and the corresponding bypass nodes. An auxiliary inductor is coupled between the corresponding bypass node and a common output node. The method further includes sequentially activating each one of the synchronous buck DC to DC converter cells including deactivating a previous one of the plurality synchronous buck DC to DC converter cells before activating a subsequent one of the plurality synchronous buck DC to DC converter cells; filtering an output of each one of the synchronous buck DC to DC converter cells in an LC tank formed by the corresponding output inductor and the capacitor connected between the common input node and the corresponding bypass node and combining the outputs of each one of the synchronous buck DC to DC converter cells at the common output node.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Several exemplary embodiments for systems, methods and apparatus for a improved DC-to-DC converters will now be described. It will be apparent to those skilled in the art that the present invention may be practiced without some or all of the specific details set forth herein.

DC-DC Converter Basics

Power electronic devices convert one type of power to another, reduce or increase voltage and current, or help compensate for power system deficiencies. As a field of study, power electronics blends three electrical engineering disciplines: power, electronics, and control. The field continues to evolve, producing innovative and cutting edge technology to manage the power demands of our modern society. High voltage power electronic applications include converting high voltage AC power (e.g. megawatts) to HVDC for transmission, compensating transmission lines, or controlling power flow. Low voltage applications include DC motor drives, DC power supplies, and low voltage rectifiers.

Power electronic switch-mode converters use high speed transistor switching to transform one type of power to another. Power electronic switch-mode converters can be classified into four distinct groups: AC to AC converters, AC to DC converters, DC to AC converters and DC to DC converters.

The AC-to-AC converter (or ac voltage controller) can output a variable AC voltage from a fixed AC source. Given an AC input voltage, an AC-to-DC converter can control its average output voltage by varying the time that its solid-state switches are conducting. The DC-to-AC converter, also known as an "inverter", takes a DC input voltage and converts it to an AC output voltage by controlling the "firing" time of its transistors.

A DC-to-DC converter, also known as a "chopper" or "switching regulator," controls its average output voltage by varying the time that its input transistor is closed. Depending on the configuration and the duty cycle of the switch, the DC-to-DC converter can reduce the input voltage to a lower output voltage (referred to as buck converters), increase the input voltage to a higher output voltage (referred to as boost converters), or convert the input voltage to both a lower output voltage and a higher output voltage (referred to as a buck-boost converter).

Buck Converters

Figure 1A:
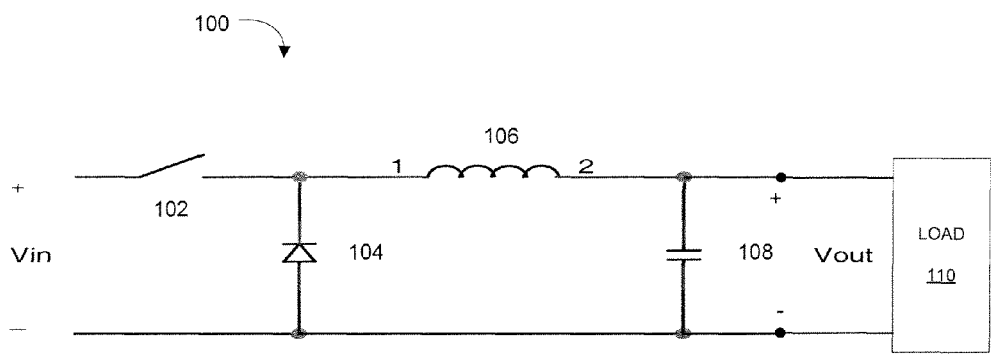
FIG. 1A is a schematic diagram of a simple buck converter circuit, in accordance with an embodiment of the present invention.

The buck converter is the most common configuration for microprocessor power applications. FIG. 1A is a schematic diagram of a simple buck converter circuit 100, in accordance with an embodiment of the present invention. The buck converter circuit 100 includes a semiconductor input switch 102, usually a MOSFET, a diode 104, an inductor 106, and a capacitor 108. The output of the buck converter circuit 100 is coupled to a load 110.

The input switch 102 is controlled by an external controller that closes (turns on) the switch for a certain percentage of the switching period. This percentage is known as the duty cycle D of the switch 104 and is defined as the on-time, $t_{on}$ of the switch divided by the switching period T given by the Formula 1.1:

$$D = \frac{t_{on}}{T}$$

The inductor 106 acts as an energy storage element and supports the load 110 when the input switch 102 is off. When the input switch 102 is closed at t=0, the inductor 106 charges and current through the inductor increases to a maximum value after the time duration $t_{on}$. In an ideal circuit having a constant input voltage $V_{in}$ and output voltage $V_{out}$, the voltage across the inductor $v_L$ during this time is given by Formula 1.2:

$$v_L = V_{in} - V_{out} = L\frac{di_L}{dt}$$

Rearranging the formula 1.2 yields a positive linear slope for inductor current while the input switch 102 is closed as shown in Formula 1.3:

$$\frac{di_L}{d_t} = \frac{V_{in} - V_{out}}{L} = \frac{\Delta i_L}{t_{on}}$$

Solving Formula 1.1 for $t_{on}$, substituting into Formula 1.3, and solving for $\Delta I_L$ produces an expression for the change in inductor current when the switch is closed given by Formula 1.4:

$$\Delta i_L = \frac{V_{in} - V_{out}}{L}DT$$

After reaching $t_{on}$ the input switch 102 opens and the inductor current "freewheels" through the load 110 and the diode 104, decreasing during the time duration $t_{off}$ to a minimum value at the end of the switching period. After following the same procedure that produced formulas 1.2-1.4, the change in inductor current with the input switch 102 in an open state can be expressed as shown in Formula 1.5:

$$\Delta i_L = -\frac{V_{out}}{L}(1-D)T$$

Figure 1B:
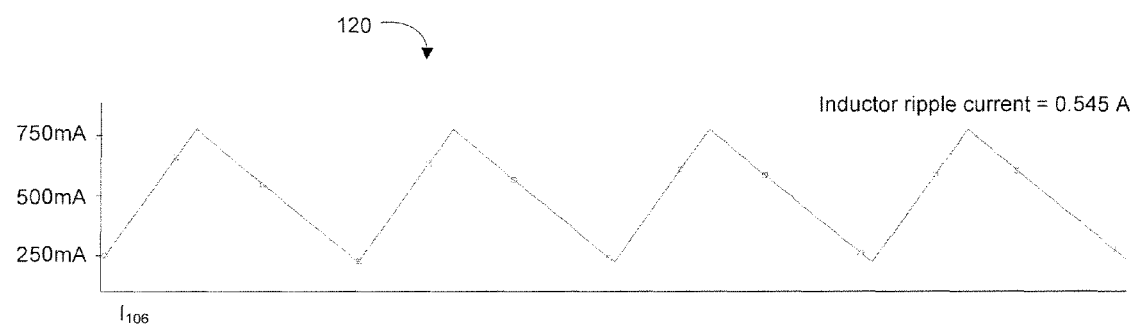
FIG. 1B is a graphical representation of the change in inductor current $\Delta I_L$, in accordance with an embodiment of the present invention.

FIG. 1B is a graphical representation 120 of the change in inductor current $\Delta I_L$, in accordance with an embodiment of the present invention. The change in inductor current $\Delta I_L$, is a peak-to-peak ripple of the inductor current. The value of the inductor 106 directly impacts the peak-to-peak ripple of the inductor current.

The buck converter 100 takes advantage of the properties of the inductor 106 to provide a simple means of converting DC voltage. In steady state, the average voltage across the inductor 106 is zero over one switching period as shown in Formula 1.6:

$$(V_{in}-V_{out})t_{on}-V_{out}(T-t_{off})=0$$

Solving Formula 1.1 for $t_{on}$, substituting into Formula 1.6, and solving for $V_{out}$ yields an expression for the output voltage for the buck converter 100 as shown in Formula 1.7:

$$V_{out}=DV_{in}$$

The value of D is less than one so for the buck converter 100, the output voltage is less than the input voltage. The duty cycle of the input switch 102 determines the output voltage. The duty cycle of the input switch 102 can be varied to meet the output voltage design specifications for the buck converter 100.

Figure 1C:
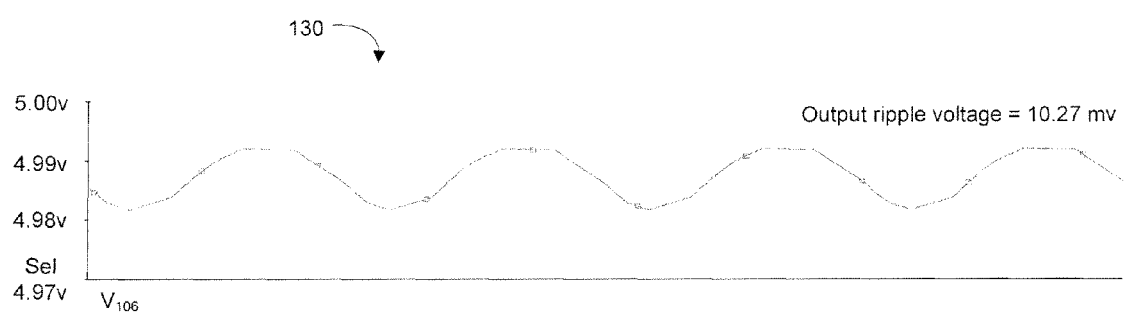
FIG. 1C is a graphical representation of the output voltage ripple, $\Delta V_{out}$, in accordance with an embodiment of the present invention.

The above description of the operation of the buck converter 100 is for a continuous conduction mode (CCM), with the inductor current remaining positive throughout the entire switching period. If the inductor current drops below zero and remains below zero for a finite time during the switching period, the buck converter 100 is operating in discontinuous conduction mode (DCM). The value of the inductor 106 determines whether the buck converter 100 operates in CCM or DCM. Considering that the average inductor current equals the average resistive load current, the minimum inductor value to maintain CCM can be expressed as shown in Formula 1.8:

$$L_{min} = \frac{(1-D)R}{2f_s}$$

Where $f_s$ is the switching frequency of the buck converter 100 and R is the resistance value of the load 110. The buck converter 100 includes the capacitor 108 across the output to filter the inductor current ripple. FIG. 1C is a graphical representation 130 of the output voltage ripple, $\Delta V_{out}$, in accordance with an embodiment of the present invention. The value of the capacitor inversely affects the output voltage ripple, $\Delta V_{out}$ as shown in Formula 1.9:

$$\Delta V_{out} = \frac{(1-D)}{8LCf_s^2}V_{out}$$

Figure 1D:
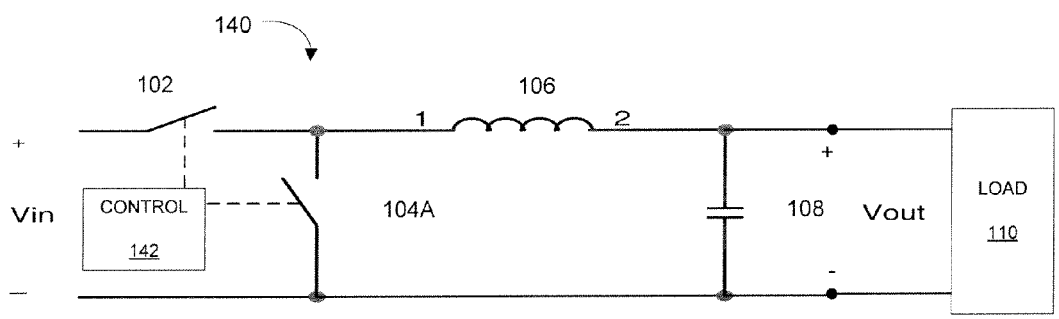
FIG. 1D is a schematic diagram of a synchronous buck converter circuit, in accordance with an embodiment of the present invention.

FIG. 1D is a schematic diagram of a synchronous buck converter circuit 140, in accordance with an embodiment of the present invention. The synchronous buck converter 140 includes a second semiconductor switch 104A in place of the diode 104 in the asynchronous buck converter 100 of FIG. 1A. The buck converter 100 of FIG. 1A is asynchronous because the diode 104 does not switch or change states between conductive and non-conductive when the input switch 102 does.

The second switch 104A is activated by the same control circuit 142 that activates the input switch 102. The second switch 104A allows a freewheeling path for inductor current when the input switch 102 is open. Compared to diode 104, the second switch 104A provides a lower voltage drop. The lower voltage drop improves overall efficiency of the synchronous buck converter 140 as compared to asynchronous buck converter 100 by reducing power loss during conduction.

Multiphase DC to DC Converters

Figure 1E:
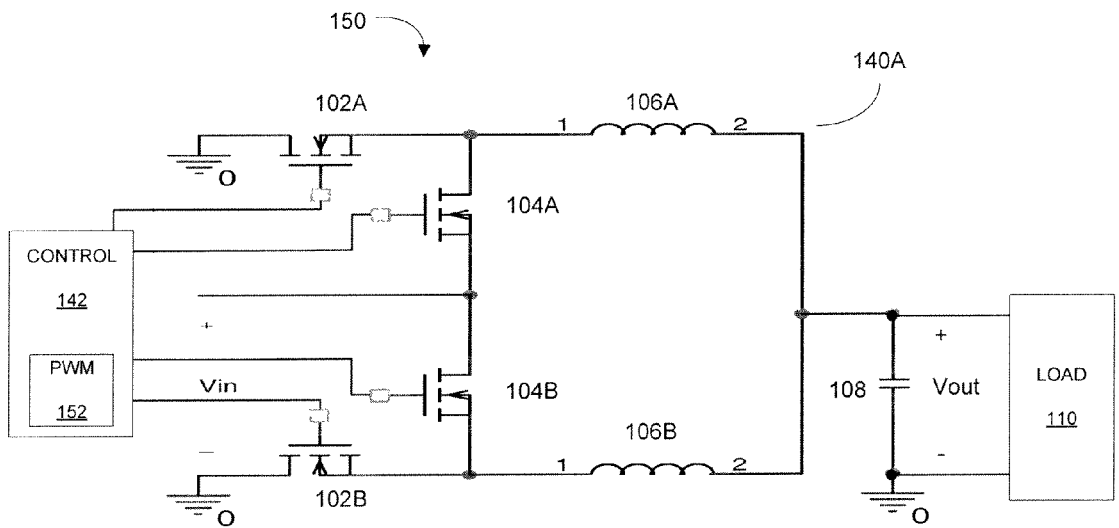
FIG. 1E is a schematic of a multiphase buck converter system, in accordance with an embodiment of the present invention.

Demands for higher current output from DC to DC converters have prompted the development of "multiphase" DC to DC converter systems. FIG. 1E is a schematic of a multiphase buck converter system 150, in accordance with an embodiment of the present invention. The multiphase buck converter system 150 includes two synchronous buck converters 140A and 140B in a parallel configuration. The multiphase buck converter system 155 includes four synchronous buck converters 140A-140D in a parallel configuration.

The term "multiphase" is used since each input switch 102A, 102B and second switch 140A, 104B opens and closes out-of-phase with the other switches in the other synchronous buck converters 140A and 140B during each switching period. Each of the synchronous buck converters 140A and 140B are referred to as converter cells of the multiphase buck converter system 150.

Each cell (140A and 140B in converter 150 and 140A-D in converter 155) shares a portion of the total output current of the multiphase buck converter systems 150, 155, respectively.

As a result, the multiphase buck converter systems 150, 155 can support a higher output current without using specialized and expensive components.

The control circuit 142 provides control signals to each input switch and each second switch (i.e., input switch 102A, 102B and second switch 104A, 104B in converter 150 and input switches 102A-D and second switches 104A-D of converter 155) within a certain phase or portion of the switching period. The control circuit 142 can include a pulse width modulator circuit (PWM) 152 for generating the control signals for each switch 102A, 102B, 104A, 104B.

By way of example, for a multiphase buck converter system having four cells in a parallel configuration (i.e., 4-phase buck converter 155), each PWM control signal should be 90° out of phase with the signal that is produced before and after it. Each control signal is coupled to both the respective input switch and second switch in each cell. By way of example, the same control signal is applied to both the input switch 102A and second switch 104A of the first cell 140A. Similarly, a second control signal is applied to both the input switch 102B and second switch 104B of the second cell 140A. Further, a third control signal is applied to both the input switch 102C and second switch 104C of the third cell 140C. Further still, a fourth control signal is applied to both the input switch 102D and second switch 104D of the fourth cell 140D.

Figure 1F:
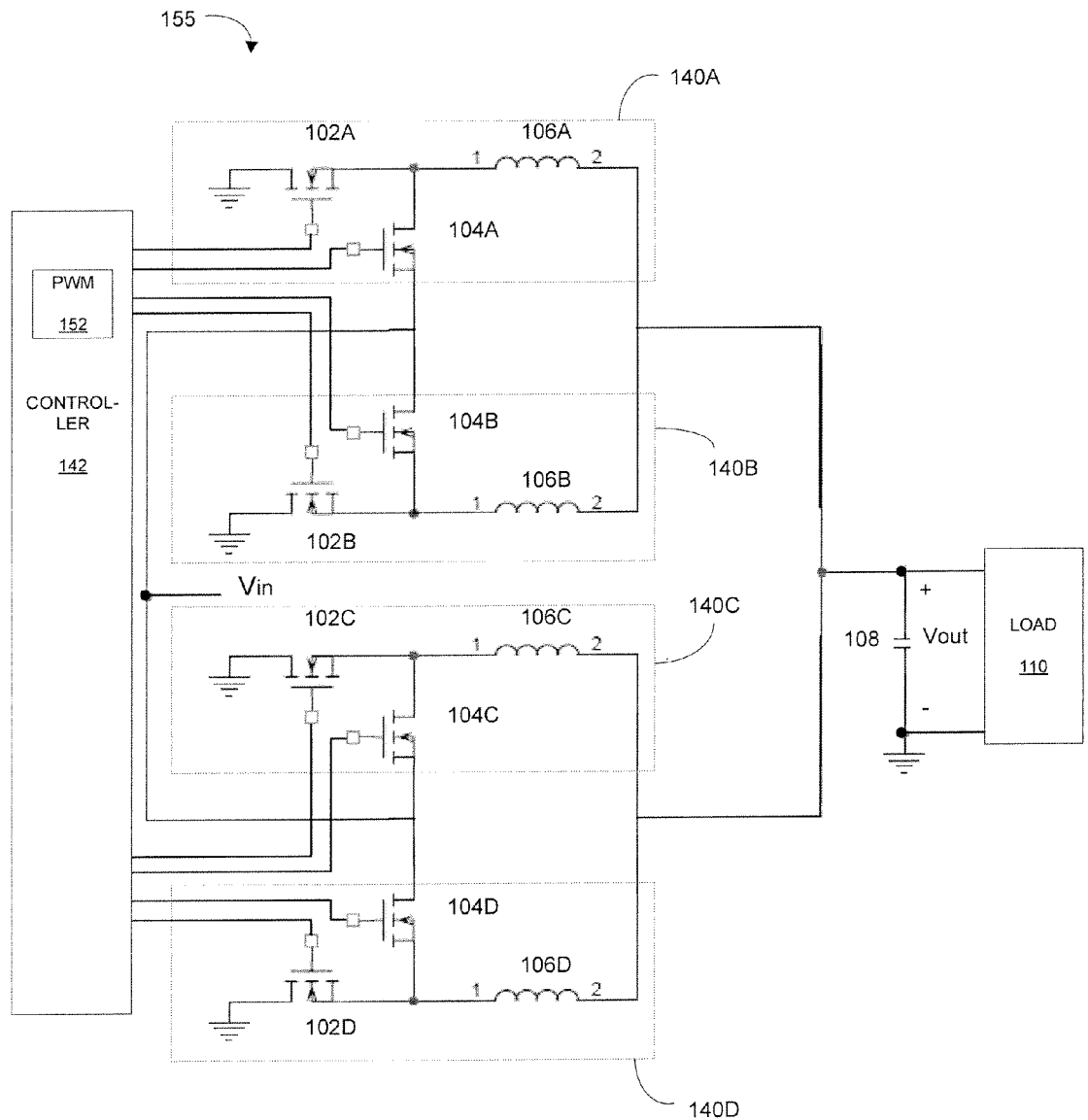
FIG. 1F is a schematic of a 4-phase buck converter system, in accordance with an embodiment of the present invention.
Figure 1G:
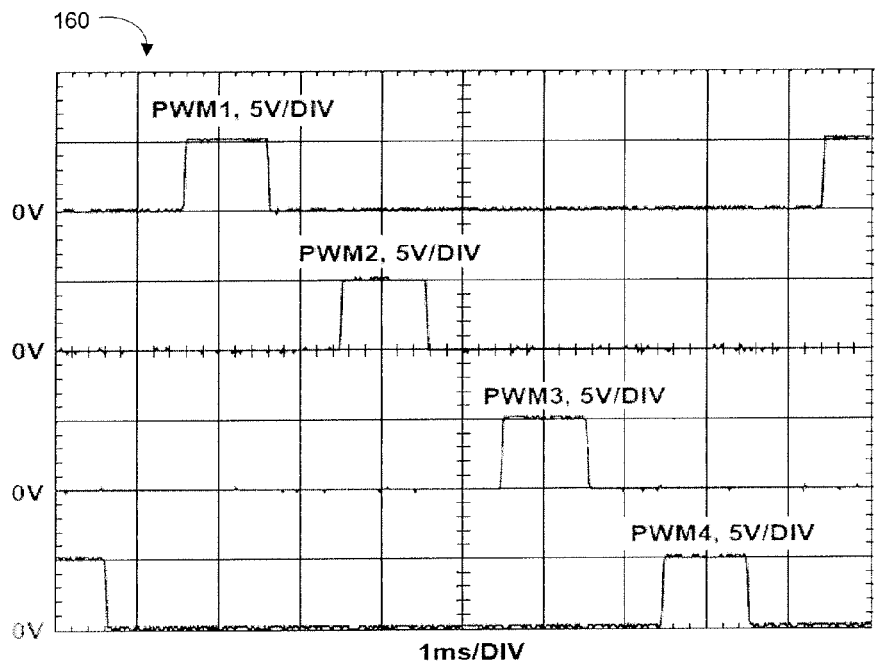
FIG. 1G is a graphical representation of a control signal output by the control circuit, for the 4-phase buck converter, in accordance with an embodiment of the present invention.

FIG. 1G is a graphical representation 160 of a control signal output by the control circuit 142, for the 4-phase buck converter 155, in accordance with an embodiment of the present invention. The 4-phase buck converter 155 has a switching period of 8 milliseconds. In an exemplary embodiment, the 8 millisecond switching period is divided into 8 equal portions of 1 millisecond each. The control circuit 142 produces a first control signal PWM1 for the first cell for only the first 1 millisecond portion. The control circuit 142 produces a second control signal PWM2 for the second cell for only the third 1 millisecond portion. The control circuit 142 produces a third control signal PWM3 for the third cell for only the fifth 1 millisecond portion. The control circuit 142 produces a fourth control signal PWM4 for the fourth cell for only the seventh 1 millisecond portion. The control circuit 142 produces on control signals during the second, fourth, sixth and eighth 1 millisecond portions.

For the multiphase buck converter, the $t_{on}$ of each switch 102A, 102B, 104A, 104B is typically set to be conducting for a period less than the switching period T divided by the number of phases N, to prevent signal overlapping as shown in Formula 1.10:

$$t_{on} < \frac{T}{N}$$

Substituting Formula 1.10 into Formula 1.1 and solving for D yields:

$$D < \frac{1}{N}$$

Compared to the single-phase buck converter 140, the multiphase buck converters 150 155 have smaller amplitude output current ripple due to the inherent inductor ripple cancellation.

Figure 1H:
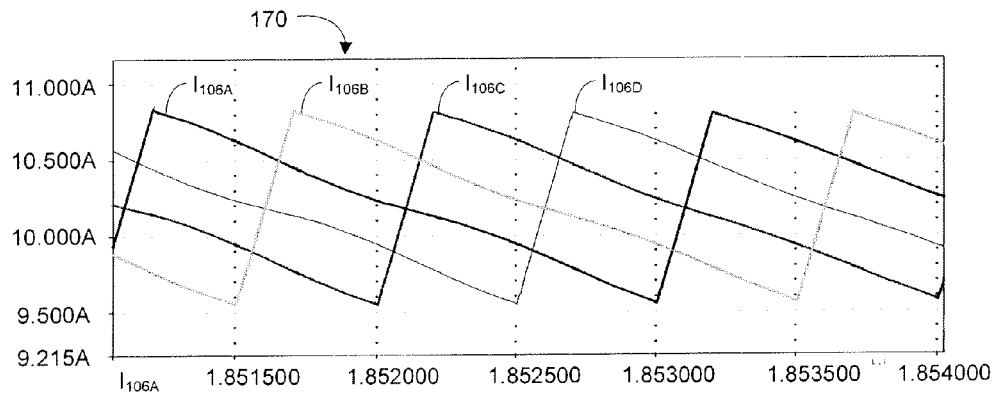
FIG. 1H is a graphical representation of the output current of each converter cell of a 4-phase buck converter, in accordance with an embodiment of the present invention.

Using Kirchoff's current law (KCL), the output current of the multiphase buck converter is the sum of the current output of each cell. FIG. 1H is a graphical representation of the output current 170 each cell 140A-D of the 4-phase buck converter 155, in accordance with an embodiment of the present invention. The output current 170 graph shows the overlapping inductor currents for each of the inductors 106A-D entering the output load 110.

At any given time, the slope of the current through any one of the inductors 106A-D is positive while all others are negative. When the currents sum together at the output, the negative current slopes act to cancel the positive current slope, reducing the overall output current ripple. The total output ripple current is given by Formula 1.12:

$$\Delta i_{out} = \frac{V_{out}(1 - ND)}{Lf_s}$$

The total output ripple current value can also be found using a graphical method. A normalized parameter $K_{NORM}$ is found by the following Formula 1.13:

$$K_{NORM} = \frac{V_{out}}{Lf_s}$$

Figure 1J:
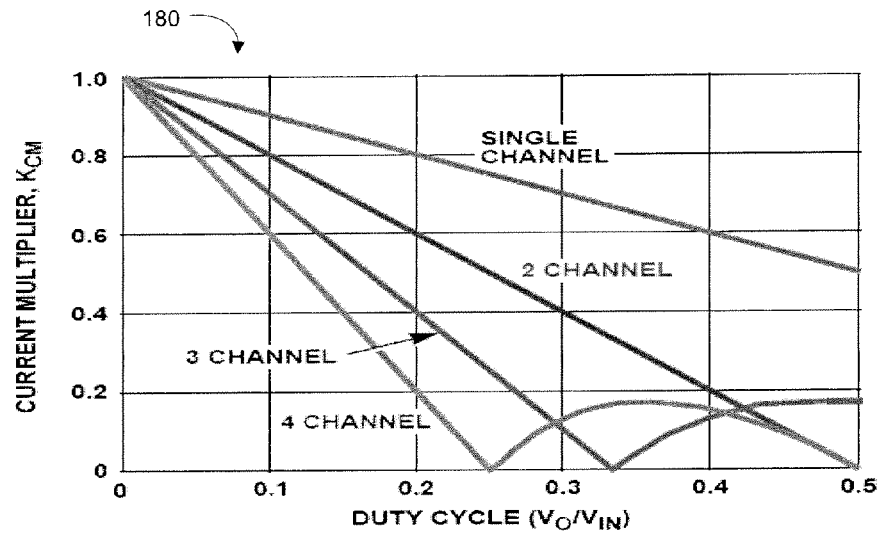
FIG. 1J is a graphical representation of the output ripple current cancellation effect with respect to a duty cycle of a 4-phase buck converter, in accordance with an embodiment of the present invention.

FIG. 1J is a graphical representation 180 of the output ripple current cancellation effect with respect to a duty cycle of a 4-phase buck converter 155, in accordance with an embodiment of the present invention. In FIG. 1J, the current multiplier factor $K_{CM}$ is determined by finding the y-axis value at the intersection of the duty cycle and the active channel curve that corresponds to the number of phases in the system. The total output current ripple is then found by multiplying $K_{NORM}$ by $K_{CM}$ in Formula 1.14:

$$\Delta i_{out} = K_{NORM} K_{CM}$$

The reduction of output current ripple in the multiphase buck converter reduces the capacitance requirements. The reduction of output current ripple in the multiphase buck converter also helps meet the more stringent requirements for powering microprocessors using multiphase voltage regulator modules (VRM).

For modern computer applications, the voltage regulator module (VRM) or the voltage regulator down (VRD) powers the processor using multiphase buck converter systems. The VRM and VRD can be configured as removable modules that plug into the system board or non-removable modules that are soldered directly to the system board. The VRM or VRD can interface with the microprocessor through a voltage identification (VID) code that allows the microprocessor to select the VRM output voltage between selected ranges. By way of example between about 0.4 V to 1.7 V. Processor manufacturers have stringent specifications for VRMs that power their processors. The stringent specifications include required ranges and characteristics for input and output voltage and current, efficiency, control inputs, current sharing, and VID inputs.

The rated input and output voltage refers to the normal (or nominal) voltage level that a buck converter has been designed to accommodate. However, the buck converter should be able to regulate the output for a designated range of input voltages. The limits of this range can exceed about ±25% of the nominal value. Line regulation is a measure of a converter's ability to regulate its output under changing input conditions, and is given by Formula 1.15:

$$\% \text{ Line Regulation} = \frac{V_{out-high} - V_{out-low}}{V_{out-nom}} \times 100\%$$

Where $V_{out-high}$ is the average output voltage at the highest input voltage, $V_{out-low}$ is the average output voltage at the lowest input voltage, and $V_{out-nom}$ is the rated (or nominal) average output voltage, all measured at full load.

The buck converter can experience fluctuations in load at the output and can also regulate the output voltage under such conditions. Load regulation is a measure of a buck converter's ability to regulate the output voltage under changing load conditions and is given by Formula 1.16:

$$\% \text{ Load Regulation} = \frac{V_{out-minload} - V_{out-full\ load}}{V_{out-nom}} \times 100\%$$

Where $V_{out-min-load}$ is the average output voltage at the minimum load value, $V_{out-full\ load}$ is the average output voltage at the rated load or power, and $V_{out-nom}$ is the rated (or nominal) average output voltage, all measured at nominal input voltage.

When designing and implementing buck converters, efficiency rating is an important and closely monitored parameter. For the buck converter, efficiency indicates the percentage of input power that reaches the output and is given by the following Formula 1.17:

$$\% \text{ efficiency} = \frac{P_{out}}{P_{in}} \times 100\%$$

For an ideal buck converter, circuit elements other than resistors consume no power and the power input equals the power output and therefore the efficiency is 100%. However, real circuit elements have an associated resistance and consume a portion of the input power when current passes through them. By Ohm's law, each circuit element conducting current (e.g. MOSFET, capacitor, inductor, etc) in a buck converter will dissipate power $P_{element}$ based on the following Formula 1.18:

$$P_{element} = I_{RMS-element}^2 R_{element}$$

Where $I_{RMS-element}$ is the total root mean squared (RMS) current though the element in one switching period and $R_{element}$ is the associated resistance of the circuit element. All circuit elements carrying current, along with switching losses during switch ON/OFF transitions, will contribute to a total power loss $P_{loss}$ in the buck converter. Since the input power includes the sum of the output power and power loss in the circuit, the efficiency Formula 1.17 can be expressed in terms of $P_{out}$ and $P_{loss}$ as shown in Formula 1.19:

$$\% \text{ efficiency} = \frac{P_{out}}{P_{out} + P_{loss}} \times 100\%$$

Multiphase Buck Converter with an Input-Output LC Tank

The input-output LC tank, multiphase buck converter circuit can supply low output voltage at relatively high output current. The input-output LC tank, multiphase buck converter circuit includes an input-output LC tank within each one of the cells of the converter. Alternatively, the input-output LC tank, multiphase buck converter circuit can include an input-output LC tank within each set two cells of the converter. The input-output LC tank provides a near zero ripple on the output voltage and output current. LC tank circuits are typically used as a filter circuit at an output stage and sometimes at the input stage of a typical converter circuit. The LC tank included in the input-output LC tank, multiphase buck converter circuit described herein is different as it connects the input of the converter circuit to the output of the converter circuit and includes a capacitance value of the bypass capacitor that is relatively small as compared to a typical capacitance value in a typical LC tank filter circuit. The small capacitance provides a high impedance path in the input-output LC tank. Input-output LC tank stores energy as used herein where typical systems use LC tanks as filters. Connecting the input to output through the input-output LC tank suppresses ripples in the output voltage and output current more effectively than a typical approach of placing an LC tank filter at the output stage. As a result, the input-output LC tank, multiphase buck converter circuit described herein can provide superior load and line regulation performance over the typical DC-DC converter systems. The input stage and the output stage are two different and separate stages of the converter circuit. Typical approaches minimize any direct connection between the input stage and output stage so as to avoid coupling input noise to the output voltage and current and to avoid coupling output load variations to the input stage.

The near zero output ripple provides multiple benefits, including smaller output inductors, smaller output filter capacitance, smaller overall board-size and smaller volume, and improved overall power efficiency of the converter. Due to the additional storage component in the input-output LC tank, multiphase buck converter circuit, a faster transient response to changes in the load current. The faster transient response to changes in the load current can be crucial in microprocessor applications. The LC tank, multiphase buck converter circuit maintains a switching frequency multiplication property at both the output current and the input current, along with load current sharing capability distributed between the individual cells.

The input-output LC tank, multiphase buck converter circuit solves major issues related to providing high current output at very low voltage. For example, the requirements for very low ripple output voltage and output current, fast transient response and increasing frequency component of input currents and output currents.

The input-output LC tank, multiphase buck converter circuit produces substantially zero ripple on output current and output voltage. One immediate and future application of at least one embodiment of the input-output LC tank, multiphase buck converter circuit is within voltage regulator modules (VRMs) for powering microprocessors.

Figure 2:
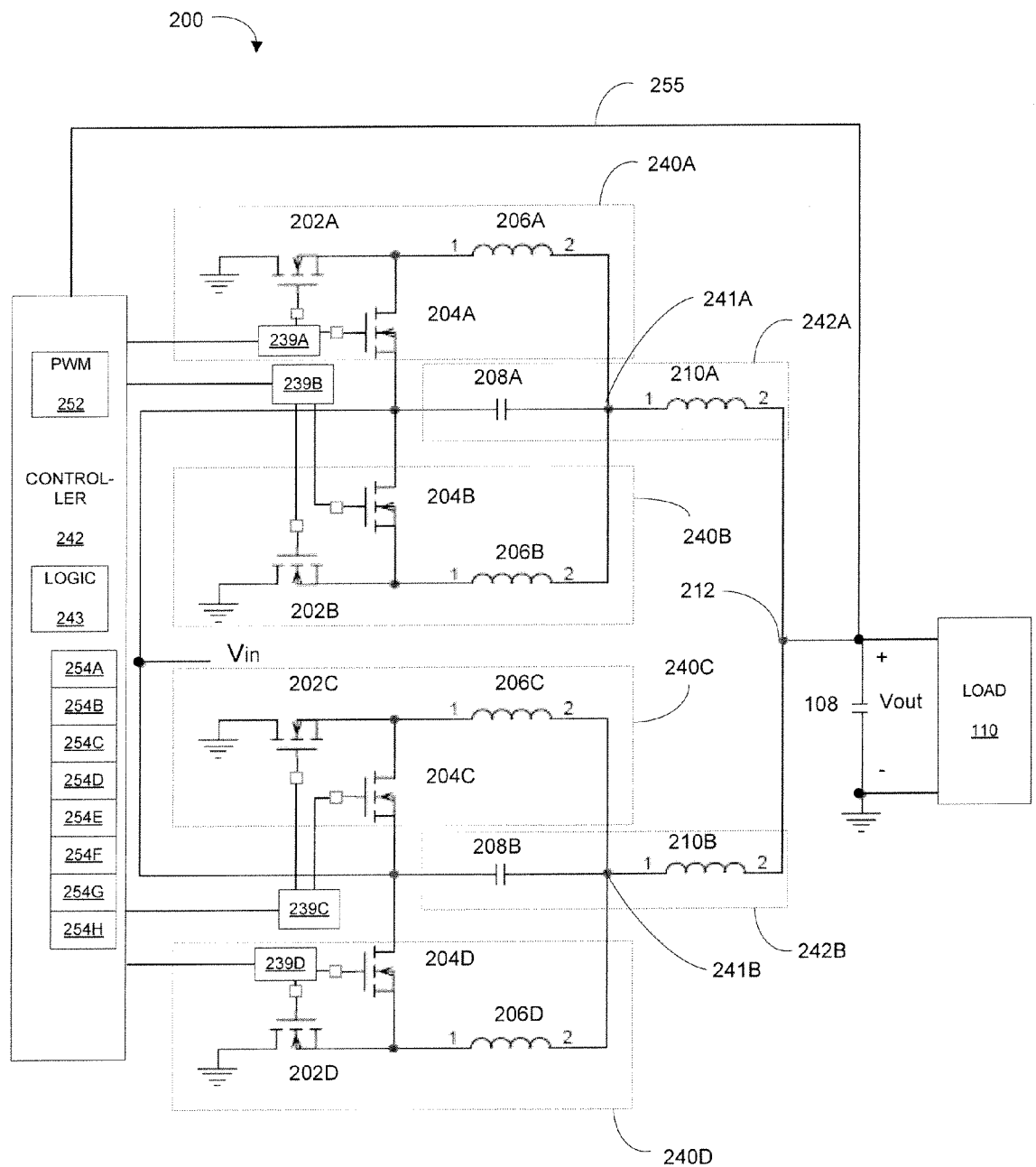
FIG. 2 is a schematic diagram of an input-output LC tank, multiphase buck converter circuit, in accordance with an embodiment of the present invention.

FIG. 2 is a schematic diagram of an input-output LC tank, multiphase buck converter circuit 200, in accordance with an embodiment of the present invention. The input-output LC tank, multiphase buck converter circuit 200 includes four cells 240A-240D. More than four phase circuits or cells could be added as deemed necessary.

The cells 240A-240D are grouped together in pairs. By way of example, cells 240A and 240B are grouped together in a first cell pair and cells 240C and 240D are grouped together in a second cell pair. Each of the cell pairs includes respective LC tank circuits 242A and 242B. The respective LC tank circuits 242A and 242B couple the input node Vin of the cell pairs to the output node 212. The addition of LC tank circuits 242A and 242B enables the multiphase buck converter 200 to produce both output current and output voltage with substantially zero ripple.

Each cell pair has a common node shared with a respective inductor 210A, 210B and a respective bypass capacitor 208A, 208B that completes the respective LC filters 242A, 242B. An output filter capacitor 108 is coupled to the node 210 common with the LC filter inductors 210A, 210B.

The control signals output by control circuit 242 that are applied to the respective input switch 202A-202D in each cell 240A-240D are out-of-phase by 360 degrees/N, where N is the number of cells. In the schematic of FIG. 2, there are four cells 240A-240D, therefore all four input switch control signals 202A-202D are out of phase by 90 degrees as shown in FIG. 1F. As described above the control signals output by control circuit 242 can be generated by a pulse width modulation circuit 252.

Figure 3A:
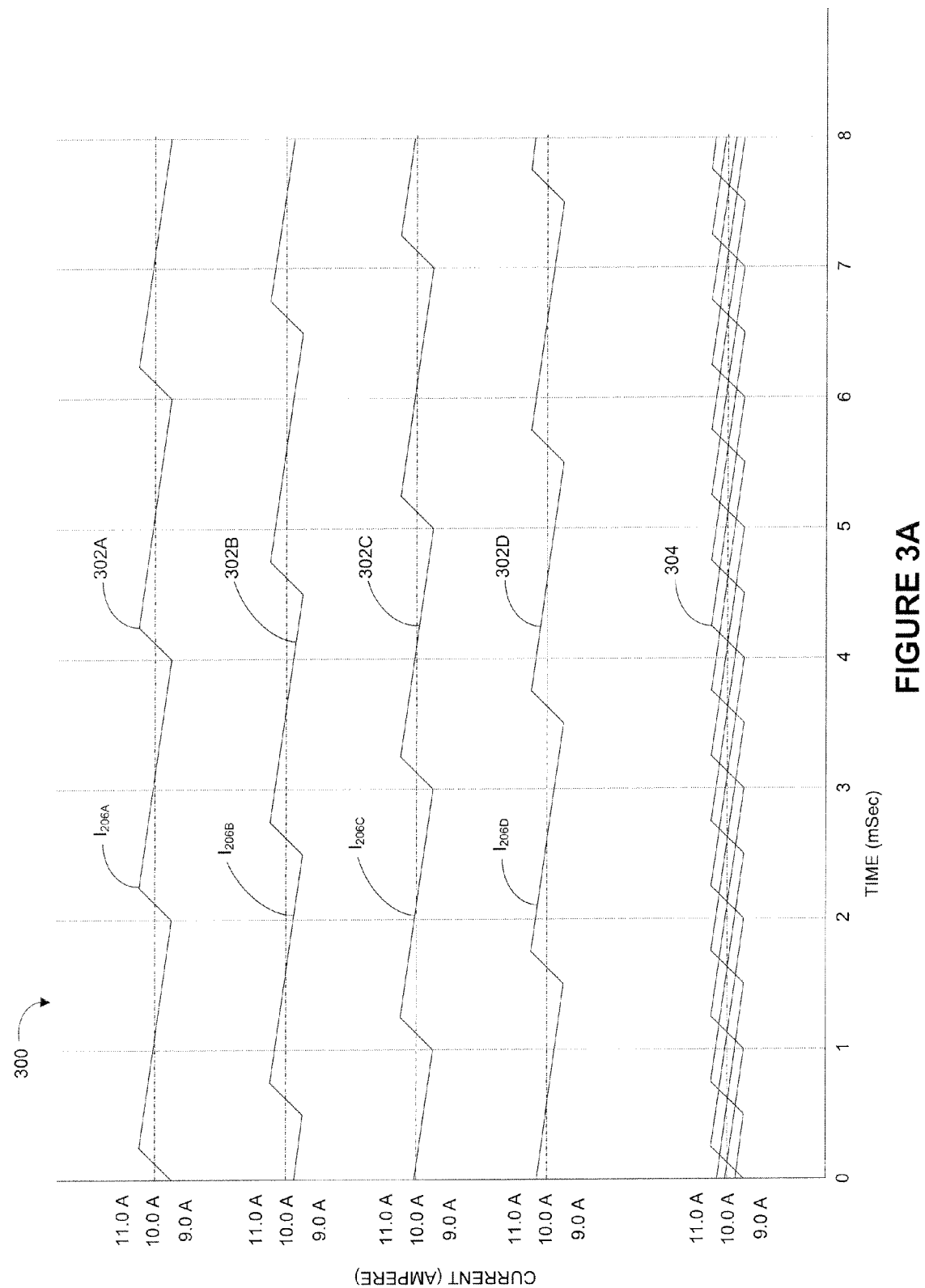
FIG. 3A is a graphical representation of the output currents of the input-output LC tank, multiphase buck converter circuit, in accordance with an embodiment of the present invention.

FIG. 3A is a graphical representation 300 of the output currents of the input-output LC tank, multiphase buck converter circuit 200, in accordance with an embodiment of the present invention. The output current graphs 302A-302D from the respective cells 240A-240D are shown illustrating their respective ripple values. The sum graph is the output current 304 output from the input-output LC tank, multiphase buck converter circuit 200 at the output node 210. The sum graph 304 illustrates a much smaller ripple in the output current 304 of the converter 200.

Frequency multiplication can occur in the input-output LC tank, multiphase buck converter circuit 200 at both the input current and the output current. More specifically, if a switching frequency fs is applied to the switches 202A-202D, 204A-204D of the input-output LC tank, multiphase buck converter circuit 200, then both input current and output current have a fundamental noise component at N-times fs. For the four cell input-output LC tank, multiphase buck converter circuit 200, this would be 4*fs as shown in FIG. 3A where the frequency of the peaks and valleys of ripple of the sum current graph 304 are 4 times the frequency of the peaks and valleys of ripple of each of the output current graphs 302A-302D from the respective cells 240A-240D. The frequency multiplication allows for smaller component sizes and therefore a more compact overall size of the input-output LC tank, multiphase buck converter circuit 200. The frequency multiplication also allows the input-output LC tank, multiphase buck converter circuit 200 to respond faster to load transients on the output or the input.

When determining design parameters and cell components, each cell 240A-240D of the input-output LC tank, multiphase buck converter circuit 200 is analyzed as an independent converter. Referring again to FIG. 2, at an ideal steady state DC condition, the bypass capacitors 208A and 208B are an open circuit and the filter inductors 210A and 201B are a short circuit, connecting the converter output 212 to the output 241A, 241B of the cells 240A-D. In one exemplary embodiment, each cell 240A-D will have an input DC voltage of 12 V and an output DC voltage of 1 V. Using these values and Formula 1.7, the duty cycle of each cell of the multiphase converter 200 is calculated as follows:

$$D = \frac{V_{out}}{V_{in}} = \frac{1 \text{ V}}{12 \text{ V}} = 0.083\overline{3}$$

The cell inductors 206A-D provide a ripple value for each cell output current. The ripple value for each cell output current is reduced at the output 212 by the multiphase current ripple cancellation effect as shown in FIG. 3A. Based on Formula 1.4, increasing the inductance of the cell inductors 206A-D reduces current ripple value output from each of the cells 240A-D. However, surface mounted inductors are considerably larger than other surface mounted devices such as resistors. The size of the inductor increases as the inductance value increases. Each of the cell inductors 206A-D will be carrying about one quarter of the output current of the converter 200. If the input-output LC tank, multiphase buck converter circuit 200 is intended to produce 40 A current then each of the cell inductors 206A-D will be carrying about one quarter of 40 A or about 10 A. A cell inductor ripple of 1.0 A, about 10% of the cell output current, is used to allow for a reasonable sized inductor without compromising converter performance. Using this cell inductor current ripple amplitude of 1.0 A, and rearranging Formula 1.4, yields a value for L as shown as follows:

$$L = D \frac{V_{in} - V_{out}}{\Delta i_L f_s} = (0.0833) \frac{(12\ V - 1\ V)}{(1A)(500 \times 10^3\ Hz)} = 1.83\ \mu H$$

In an exemplary embodiment, a 1.75 μH surface mount inductor was chosen for each of the cell inductors 206A-D. The 1.75 μH surface mount inductor has a direct current resistance of 2.84 mΩ. Direct current resistance refers to the wire resistance of the inductor; a low direct current resistance allows the inductor to carry more current and helps minimize power loss. Since two inductor currents combine into one, for example 206A and 206B combine into 210A, then a theoretical value between half to a full output inductance would be applicable in an exemplary embodiment. Therefore in an exemplary embodiment, the values for 206A-206D should each be greater than the value of 210A or 210B.

The minimum value of the output capacitor 108 in the converter 200 is selected by solving formula 1.9 for C and using the above inductor value of 1.75 μH with the desired output ripple, $\Delta V_{out}=50$ mV as follows:

$$C = \frac{(1-D)}{8Lf_s^2} \cdot \frac{V_{out}}{\Delta V_{out}}$$
$$= \frac{(1-0.0833)}{8(1.75 \mu H)(500 \times 10^3\ Hz)^2} \cdot \frac{1\ V}{50 \times 10^{-3}\ V}$$
$$= 5.24\ \mu F$$

In an exemplary embodiment the output capacitor 108 can be surface mount tantalum capacitor. Compared to other capacitor material types, tantalum capacitors feature a lower effective series resistance and superior capacitance per volume, allowing for higher capacitance values in a smaller physical package size. The capacitance values for capacitors 208A-B depend on how much current is desired to flow through these capacitors during their charging operations. Further, capacitors 208A-B are not part of the power path in the converter circuit and therefore, for efficiency reasons, the current flow through capacitors 208A-B should be minimized. One equation to select the capacitance value is provides as follows:

$$i_c = C \frac{\Delta V_c}{\Delta t} = C \frac{\Delta V_c}{D \cdot T_s} \Rightarrow C = i_c \frac{D \cdot T_s}{\Delta V_c} = i_c \frac{D}{\Delta V_c \cdot f_s}$$

In an exemplary embodiment circuits, where the capacitor charging current is limited to 10 mA giving the following solution:

$$C \approx (10 mA) \frac{(0.0833)}{(1) \cdot (500k)} = 1.666 nF$$

Therefore selecting a value less than 1.666 nF would satisfy the 10 mA max condition. In an exemplary embodiment of capacitance value of 1 nF was selected.

Power metal oxide semiconductor field effect transistors (MOSFETs) are used for the input switches 202A-D and second switches 204A-D for low voltage DC power converters in at least one embodiment. For the input-output LC tank, multiphase buck converter circuit 200, the MOSFET switches 202A-D and 204A-D will carry average currents from about 10 A to about 12 A with switching spike currents of up to about 25 A.

A MOSFET has an on-resistance $R_{on}$, which represents the effective DC resistance of the MOSFET when operating in the linear (or triode) region of its output i vs v characteristic. The on-resistance will determine the root mean squared (RMS) power loss of the MOSFET as shown in Formula 1.18 above.

Figure 3B:
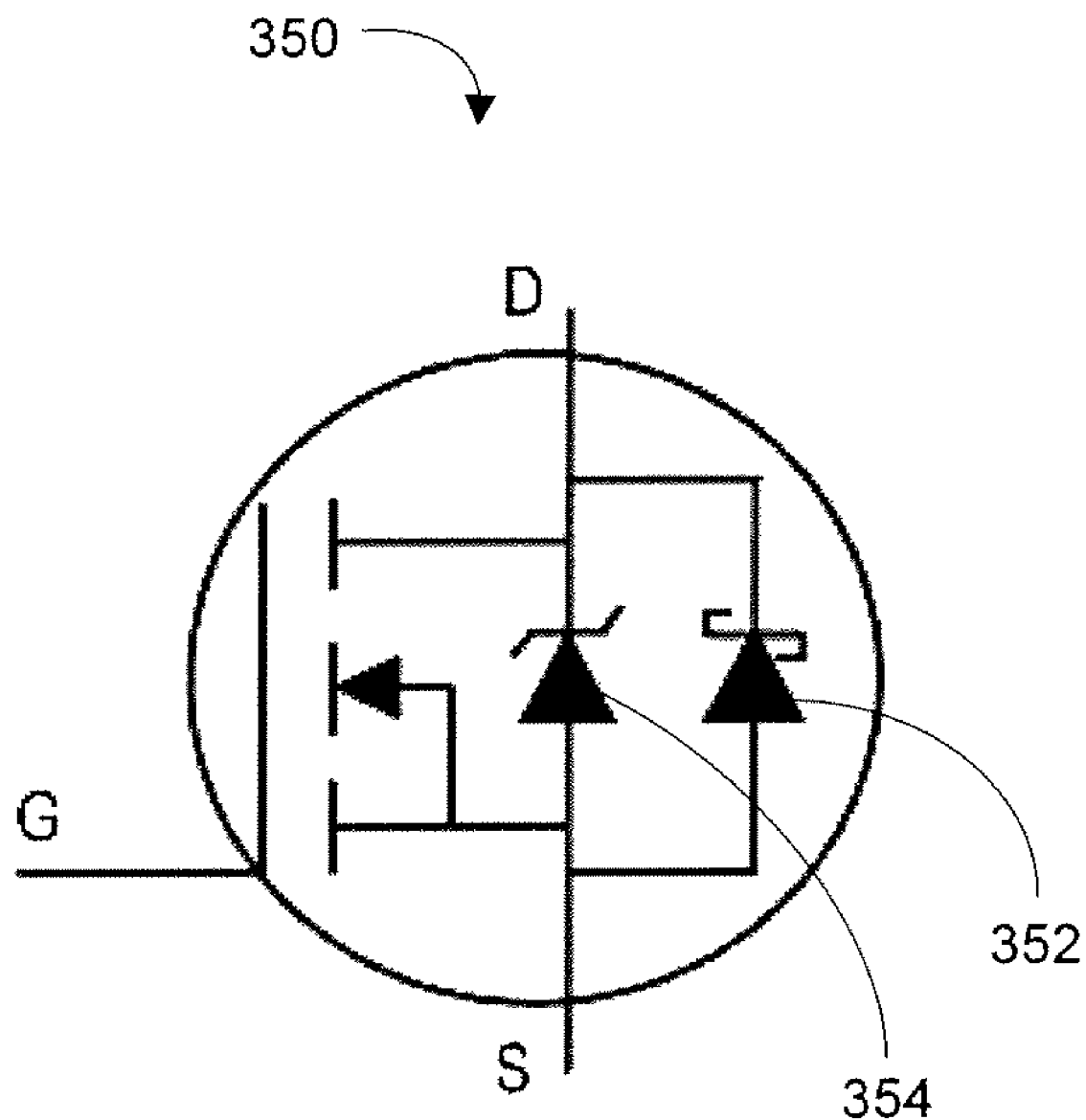
FIG. 3B is a schematic of the IRL3103D1 Fetky Power MOSFET, in accordance with an embodiment of the present invention.

In an exemplary embodiment, the input switches 202A-D and second switches 204A-D can be an International Rectifier IRL3103D1 Fetky power MOSFET or similar MOSFET. FIG. 3B is a schematic 350 of the IRL3103D1 Fetky Power MOSFET, in accordance with an embodiment of the present invention. The IRL3103D1 Fetky power MOSFET 350 has a rated drain-to-source voltage of 30 V, a rated drain current of 64 A and an on-resistance of 0.014Ω. The IRL3103D1 Fetky power MOSFET 350 features an integrated Schottky diode 352 designed to act as a shunt to the body (or parasitic) diode 354 of the MOSFET.

Under certain conditions, the body diode 354 can be forward biased and carry current when the MOSFET 350 switch is in an open state, causing undesired effects in the circuit. The Schottky diode 352 features a lower turn on voltage and therefore the Schottky diode will conduct before the body diode 354, effectively bypassing the body diode and reducing its negative effect on the input-output LC tank, multiphase buck converter circuit 200. Because the Schottky diode 352 also features a faster turn off time than the body diode 354 and because the Schottky diode will not conduct when reversed biased, the Schottky diode will not interfere with the MOSFET 350 changing states between on (conducting) and off (not conducting). As a result, the Schottky diode 352 increases the efficiency of the MOSFET 350.

The controller 242 provides PWM control signals to synchronous MOSFET control inputs for each of the input switches 202A-D and second switches 204A-D. The controller 242 can also monitor the input-output LC tank, multiphase buck converter circuit 200 output voltage and current though a feedback loop to help maintain a correct duty cycle at a selected, fixed switching frequency.

The control signals provide the correct gate voltage level to each input switch 202A-D and second switches 204A-D in each cell 240A-D, respectively. The four channel input-output LC tank, multiphase buck converter circuit 200 will use a controller with four control signals coupled to and driving a total of eight MOSFETS switches 202A-D and 204A-D.

The gate control signals can also be coupled through gate signal drivers 254A-H. The gate signal drivers 254A-H can be integrated into the controller 242. Alternatively, the gate signal drivers 254A-H can be external to the controller 242 in a separate package.

In an exemplary embodiment, a Texas Instruments TPS40090 high frequency multiphase controller in a 24-pin TSSOP package can be used as the controller 242. The TPS40090 high frequency multiphase controller operates at a switching frequency of about 500 kHz per phase. It should be understood that the frequency range can be between about 100 kHz to about 1.2 MHz per phase. The controller 242 can include resistor or DCR current sensing for over-current protection and fault protection and current mode control that forces each channel to share current equally. The Texas Instruments TPS40090 high frequency multiphase controller drives four separate Texas Instruments TPS2832 MOSFET gate drivers.

Figure 4:
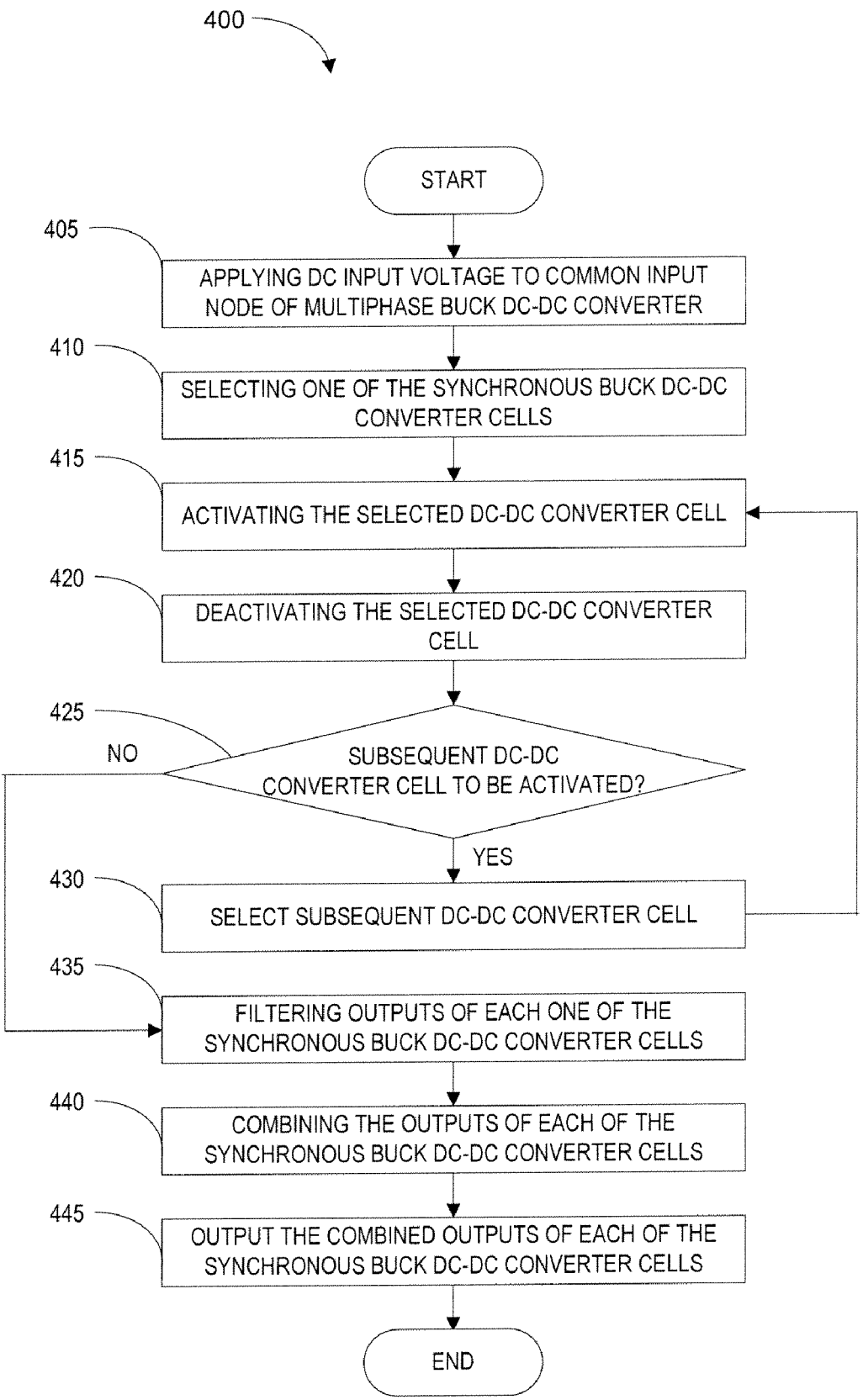
FIG. 4 is a flowchart diagram that illustrates the method operations performed in reducing a DC input voltage, in accordance with one embodiment of the present invention.

FIG. 4 is a flowchart diagram that illustrates the method operations 400 performed in reducing a DC input voltage, in accordance with one embodiment of the present invention. In an operation 405, a DC input voltage is applied to a common input node of a multiphase buck DC to DC converter. The input-output LC tank, multiphase buck converter circuit 200 is described in more detail in FIG. 2 above.

The plurality synchronous buck DC to DC converter cells are sequentially activated as described in operations 410-430 as follows. In operation 410, one of the DC to DC converter cells is selected. In operation 415, the selected DC to DC converter cell is activated. In operation 420, the selected DC to DC converter cell is deactivated.

In operation 425, the DC to DC converter cells are analyzed to determine if additional converter cells are available to be activated. If additional DC to DC converter cells are available to be activated, then in operation 430, a subsequent one of the DC to DC converter cells is selected and the method operations continue in operations 415-425 above.

In operation 435, the outputs of each of the activated DC to DC converter cells are filtered. Filtering the output of each one of the DC to DC converter cells is performed in the LC tank formed by the corresponding one of the output inductors and the capacitor connected between the common input node and the corresponding pair output node.

In an operation 440, the filtered output of each of the activated DC to DC converter cells is combined. In operation 445, the filtered, combined output of the activated DC to DC converter cells is output at the common output node (e.g., node 212 in FIG. 2 above).

A typical multiphase converter (e.g., multiphase converter 150 described above) has a output voltage ripple of about 15 mV peak to peak, an efficiency at full load of about 80%, a percent load regulation of about 1% and a percent line regulation of about 1%. For comparison, input-output LC tank, multiphase buck converter circuit 200 has an output voltage ripple of about 2.8 mV peak to peak, an efficiency at full load of about 80%, a percent load regulation of about 0.05% and a percent line regulation of about 0.04%.

One embodiment provides an input-output LC tank multiphase buck DC to DC converter. The input-output LC tank multiphase buck DC to DC converter includes multiple synchronous buck DC to DC converter cells. Each of the synchronous buck DC to DC converter cells has an input node, an output node and a control node. The synchronous buck DC to DC converter cells are arranged in a parallel configuration including having the input nodes of each one of the synchronous buck DC to DC converter cells connected together at a common input node. The synchronous buck DC to DC converter cells can also be arranged in a pairs of synchronous buck DC to DC converter cells wherein the output nodes of each one of the pairs of the synchronous buck DC to DC converter cells are connected to corresponding pair output node. Each one of the pairs of the synchronous buck DC to DC converter cells include a capacitor connected between the common input node and the corresponding pair output node and a corresponding output inductor connected between the corresponding pair output node and a common output node.

Each one of the synchronous buck DC to DC converter cells includes an input switch and a second switch. The input switch having a first voltage source input node, a input switch control node and an input switch output node, a converter cell inductor having a first end and a second end, wherein the first end of the converter cell inductor is connected to the input switch output node and the second end of the converter cell inductor is connected to the output nodes of the synchronous buck DC to DC converter cell. The second switch having a second voltage source input node, a second switch control node and a second switch output node, the second switch output node connected to the input switch output node, the input switch output node and the second switch control node coupled to a corresponding control input of the synchronous buck DC to DC converter cell.

The input-output LC tank multiphase buck DC to DC converter also includes a controller having a corresponding control output coupled to a corresponding control input of each of the synchronous buck DC to DC converter cells. The controller can include logic for sequentially activating each one of the plurality synchronous buck DC to DC converter cells. The controller can include a feedback signal input from the output of the input-output LC tank multiphase buck DC to DC converter.

Another embodiment provides a method of reducing a DC input voltage. The method of reducing a DC input voltage includes applying the DC input voltage to a common input node of an input-output LC tank multiphase buck DC to DC converter including multiple synchronous buck DC to DC converter cells. Each one of the synchronous buck DC to DC converter cells having an input node, an output node and a control node. The synchronous buck DC to DC converter cells being arranged in a parallel configuration including having the input nodes of each one of the synchronous buck DC to DC converter cells connected together at the common input node. The synchronous buck DC to DC converter cells being arranged in a pairs of synchronous buck DC to DC converter cells wherein the output nodes of each one of the pairs of the synchronous buck DC to DC converter cells are connected to corresponding pair output node. Each one of the pairs of the synchronous buck DC to DC converter cells include a capacitor connected between the common input node and the corresponding pair output node and a corresponding output inductor connected between the corresponding pair output node and a common output node. The method further includes sequentially activating each one of the synchronous buck DC to DC converter cells including deactivating a previous one of the synchronous buck DC to DC converter cells before activating a subsequent one of the synchronous buck DC to DC converter cells. An output of each one of the synchronous buck DC to DC converter cells is filtered in an LC tank formed by the corresponding inductor and the capacitor connected between the common input node and the corresponding pair output node. The outputs of each one of the synchronous buck DC to DC converter cells are combined and output at the common output node.

Multiphase Buck Converter with a Bypass Capacitor

Another approach for multiphase DC to DC converters with the ability to supply low output voltage with very high output current includes a bypass capacitor within two DC to DC converter cells in the multiphase DC to DC converter resulting in a substantially zero ripple output current. This multiphase DC to DC converter with bypass capacitor architecture allows the multiphase DC to DC converter to use physically smaller output inductors and a lighter output filter. As a result, the overall physical size and volume are reduced while increasing the efficiency of the multiphase DC to DC converter. Another benefit of the multiphase DC to DC converter with bypass capacitor architecture is an ability to respond quickly to transients upon changes in the load current. This fast response is a highly desirable feature in microprocessor applications. The multiphase DC to DC converter with bypass capacitor architecture also provides switching frequency multiplication at the output and input currents, along with load current sharing characteristic distributed into each DC to DC converter cell.

Figure 5:
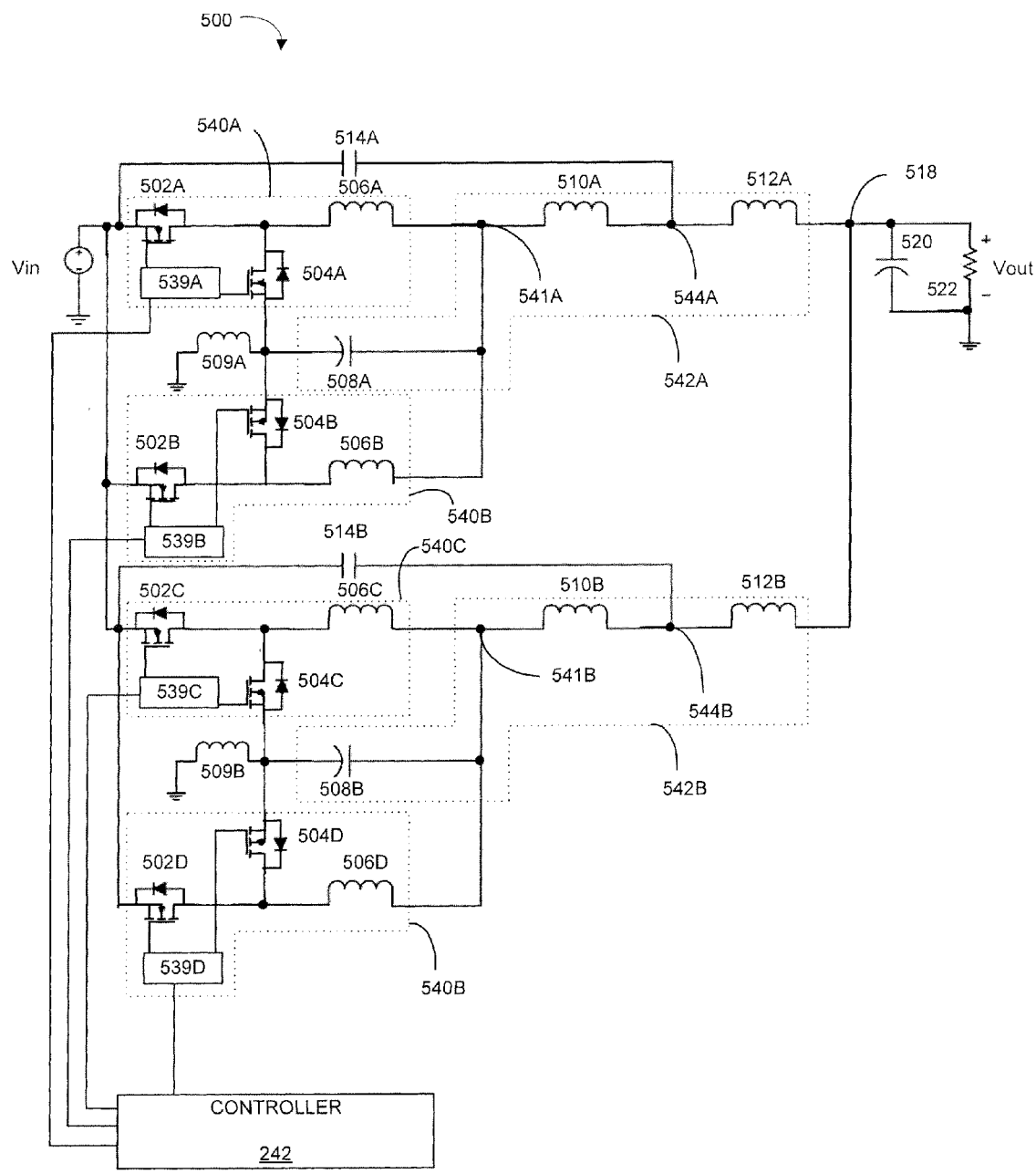
FIG. 5 is a schematic diagram of a multiphase DC to DC converter with bypass capacitor, in accordance with an embodiment of the present invention.

FIG. 5 is a schematic diagram of a multiphase DC to DC converter with bypass capacitor 500, in accordance with an embodiment of the present invention. The multiphase DC to DC converter with bypass capacitor 500 includes 4-phases or converter cells 540A-D. More cells could be added as deemed necessary. The four synchronous buck converter cells 540A-D are coupled in parallel between the input node Vin and the multiphase DC to DC converter output node 518. The converter cells 540A-D are paired to form pairs of converter cells 540A-540B and 540C-540D. Each pair of converter cells 540A-540B and 540C-540D are coupled in parallel and corresponding pair output nodes 541A, 541B. Each pair of converter cells 540A-540B and 540C-540D also have bypass LC filters coupling the input node Vin to a respective bypass node 544A, 544B. By way of example, the pair of converter cells 540A-540B have bypass LC filter including inductor 510A and capacitor 514A coupling the input node Vin to the respective bypass node 544A. Similarly, the pair of converter cells 540A-540B have bypass LC filter including inductor 510B and capacitor 514B coupling the input node Vin to the bypass node 544B.

The bypass nodes 544A, 544B of each pair of converter cells 540A-540B and 540C-540D are then paralleled through auxiliary inductors 512A and 512B to provide additional filtering. For additional energy storage and filtering, yet another LC pair can be optionally included. By way of example, the pair of converter cells 540A-540B include additional inductor 509A coupled between the second switch 504A, 504B and ground potential and an additional capacitor 508A is coupled between the second switch 504A, 504B and the bypass inductor 510A. Similarly, the pair of converter cells 540C-540D include additional inductor 509B coupled between the second switch 504C, 504D and ground and an additional capacitor 508B is coupled between the second switch 504C, 504D and the bypass inductor 510B.

The bypass capacitor 514A, 514B and two output inductors 510A and 512A and 510B and 512B, respectively, in each pair of converter cells 540A-540B and 540C-540D, enable the circuit 500 to output both output current and output voltage with substantially zero ripple value. The very low ripple on output current and output voltage is significant in low voltage and high current applications.

Figure 6:
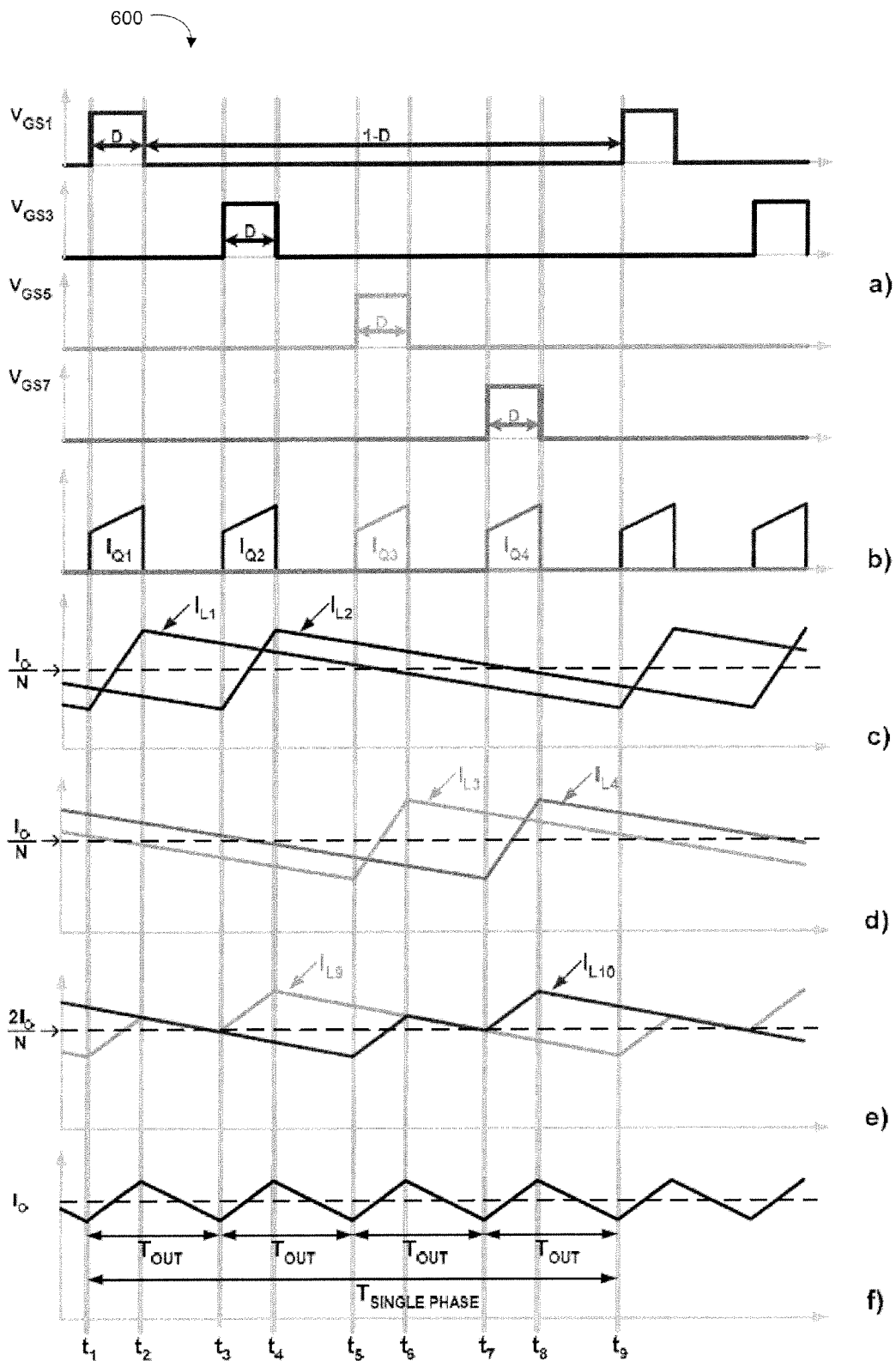
FIG. 6 is a graphical representation of the output currents of the multiphase DC to DC converter with bypass capacitor, in accordance with an embodiment of the present invention.

FIG. 6 is a graphical representation 600 of the output currents of the multiphase DC to DC converter with bypass capacitor 500, in accordance with an embodiment of the present invention. For simplicity, the second switch 504A-504D gate drive signals (control signals) and the output current waveforms of the second switch 504A-504D. A deadtime control signal is also not shown. The deadtime control signal prevents a shoot through current between the input switch 502A-502D and second switch 504A-504D.

Referring to FIGS. 5 and 6, from t1 to t2, in a steady state operation of the first pair of converter cells 540A-540B, input switch 502A is on at t1 and the current flows from the input node Vin through the output inductor 506A, to the converter cell output node 541A, through bypass inductor 510A, and the auxiliary inductor 512A to the output node 518. The current through the output inductor 506A increases linearly. Bypass capacitor 514A discharges stored energy to the input switch 502A during this time. At the same time, stored energy in inductor 509A is transferred to bypass inductor 510A through the capacitor 508A.

At time t2, the input switch 502A is turned off and second switch 504A is turned on. Current flows through second switch 504A due to energy stored in the output inductor 506A. Therefore, the output inductor current $I_{506A}$ decreases linearly until the next cycle when the input switch 502A is turned back on. The current will flow to the output node 518 through the bypass inductor 510A and the auxiliary inductor 512A. Inductor 509A stores energy from the current supplied through from capacitor 508A. The inductor current through inductor 509A increases linearly.

For the interval of t3 to t4, the input switch 502B is on and second switch 504B is off for the second synchronous buck phase cell 540B. The second synchronous buck phase cell 540B cell will behave very similar to the first synchronous buck phase cell 540A for time interval t1-t4. This process will repeat again through the third synchronous buck phase cell 540C for time interval t5-t8 and through the fourth synchronous buck phase cell 540D for time interval t9-t12.

The output inductor currents through output inductors 506A and 506B and 506C and 506D of each pair of converter cells 540A-540B and 540C-540D, respectively, will combine at nodes 514A and 514B, respectively, resulting in a ripple current cancellation effect. The combined current flows through the respective bypass inductor 510A or 510B and auxiliary inductor 512A or 512B and are summed at the output node 518 for another cancellation effect. The resulting output current has substantially reduced ripple.

Another result of the multiphase topology is the frequency multiplication effect. The period of the output current is one fourth that of a single phase period. Therefore, the output current has a frequency that is four times the single phase frequency. In broader terms, the frequency of the multiphase DC to DC converter with bypass capacitor 500 is N times the frequency of the single converter cell where N is the number of cells in the multiphase DC to DC converter with bypass capacitor.

Given the number of converter cells and the switching frequency from the design specifications, the duty cycle of the multiphase DC to DC converter with bypass capacitor 500 can be determined. Again, it should be noted that the higher switching frequency will result in fewer output capacitors to meet the same transient performance. Assume that: 1−D>N*D, where N is the number of channels and D is the duty cycle of each channel. It can be shown that the summarized current through the inductors and the output capacitor of an N-channel interleaved converter has the same waveforms as an equivalent one-channel converter with the following parameters:

$$f_{S,EQV} = N^* f_s$$

$$I_{O,EQV} = N^* I_{O,PH}$$

Where $f_{S,EQV}$ and $I_{O,EQV}$ are the switching frequency and the output inductor current of the one-channel equivalent buck converter, respectively.

In steady state, the net volt-second applied to the inductor in each converter cell over one switching cycle must be zero.

$$\left( \begin{array}{c} V_{IN} - \frac{I_O}{N} \cdot R_{Q1} - \frac{I_O}{N} \cdot R_L - \\ V_O - \frac{I_O}{N} \cdot R_{L,BP} - \frac{I_O}{N} \cdot R_{L,AUX} \end{array} \right) \cdot DT_S = $$

$$\left( \begin{array}{c} V_O + \frac{I_O}{N} \cdot R_{Q2} + \frac{I_O}{N} \cdot R_L + \\ \frac{I_O}{N} \cdot R_{L,BP} + \frac{I_O}{N} R_{L,AUX} \end{array} \right) \cdot (T_S - DT_S)$$

Solving for D yields:

$$D = \frac{V_O + (R_{Q2} + R_L + R_{L,BP} + R_{L,AUX}) \cdot \frac{I_O}{N}}{V_{IN} + (R_{Q2} - R_{Q1}) \cdot \frac{I_O}{N}}$$

Where $R_{Q1}$ is the on-resistance of the input switch 502A, $R_{Q2}$ is the on-resistance of the second switch 504A, $R_L$, $R_{L,BP}$, $R_{L,AUX}$ are the equivalent resistances of the output inductor 506A, bypass inductor 510A, and auxiliary inductor 512A, respectively.

The output inductor 506A-506D value for each converter cell 540A-540D can be calculated using the volt-seconds balance during the off time. An individual channel's inductor current ripple is obtained in Formula 3-1, as follows:

$$V_{L_O} = L_O \frac{di_{L_O}}{dt} \Rightarrow \frac{di_{L_O}}{dt} = \frac{\Delta i_{L_O}}{\Delta t} = \frac{V_{L_O}}{L_O} = \frac{V_r(1-D)}{L_O}$$

$$L_0 = \frac{V_1 \cdot (1-D)}{\Delta I_L \cdot f_s} \Rightarrow \Delta I_L = \frac{V_1 \cdot (1-D)}{L_0 \cdot f_s}$$

Where $V_1 = V_o + (R_{Q2} + R_L + R_{L,BP} + R_{L,AUX}) * I_O/N$

The combined inductor current ripple to be filtered by the output capacitors is represented in Formula 3.2 as follows:

$$\Delta I_L = \frac{V_1(1-D)}{L_o f_s} \cdot \frac{\left(\frac{m+1}{N} - D\right) N\left(D - \frac{m}{N}\right)}{D(1-D)} \Rightarrow \Delta I_L = \frac{V_1}{L_o f_s} \cdot \frac{(N \cdot D - m + 1)(m - N \cdot D)}{N \cdot D}$$

$$\Delta I_L = K_{NORM} \cdot K_{CM}$$

Where $K_{NORM} = \frac{V_1}{L_o f_s}$ and $K_{CM} = \frac{(N \cdot D - m + 1)(m - N \cdot D)}{N \cdot D}$ $K_{NORM}$ is the total inductor current ripple normalized at zero duty cycle and $K_{CM}$ is the ripple current multiplier. $K_{CM}$ is a function of duty cycle, number of channels and m as represented in FIG. 1J. Given the ripple current multiplier effect of the multiphase DC to DC converter with bypass capacitor 500, the value for the output inductor 506A-506D for each converter cell 540A-540D can be defined in Formula 3.3 as follows.

$$L_O = \frac{V_1}{\Delta I_L \cdot f_s} \cdot K_{CM}$$

The output ripple current is determined at approximately 10-40% of the total full load current capacity. After the output inductor 506A-506D is sized, the output capacitance 508A, 508B can be calculated to determine the value and the number of capacitors needed to filter the output ripple voltage ripple. The function of a capacitor is to maintain a constant voltage. A real capacitor is modeled with an equivalent series resistance (ESR), an equivalent series inductance (ESL) and a parallel resistance ($R_p$). ESR and ESL are frequency dependent whereas $R_p$ is DC dependent. At lower frequencies, ESR dominates. The output voltage ripple can be approximated by Formula 3.4 as follows:

$$\Delta V_O = \Delta I_L * ESR + \frac{\Delta I_L}{8 \cdot C_O \cdot f_s}$$

The ESR contribution is the most dominant to the output ripple voltage. The second term is contributed by the output capacitance and is normally much smaller.

Formula 2.6 provides:

$$\Delta V_O = \frac{V_O(1-D)}{8LC_o f_s^2}$$

From Formula 2.6 and Formula 3.4, a minimum output capacitance can be calculated as shown in Formula 3.5.

$$C_{O,MIN} = \frac{\Delta I_L}{8 \cdot f_s \cdot \Delta V_O}$$

The output ripple voltage is usually stated in electrical specifications of the power supply. ESR limitation to satisfy the output ripple voltage is shown in Formula 3.6 as follows:

$$ESR \leq \frac{\Delta V_O}{\Delta I_L}$$

In many practical designs, to obtain the required ESR, a capacitor with much more capacitance than is required must be selected. ESL can cause ringing in the low megahertz region but can be controlled by choosing low ESL capacitors, limiting lead length (e.g., on one or both PCB and capacitor), and replacing a single large device with multiple smaller devices connected in parallel.

Figure 7:
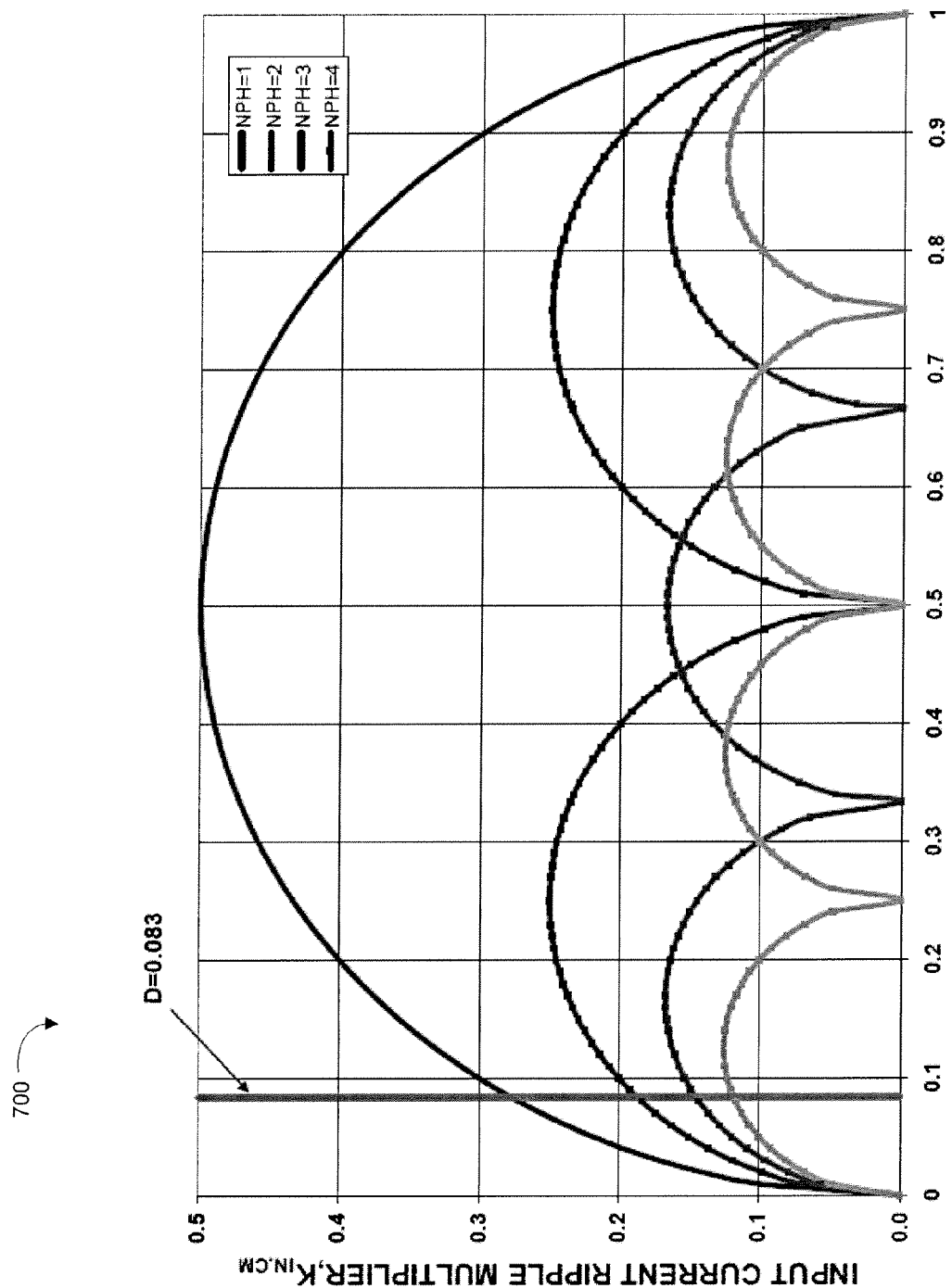
FIG. 7 is a graphical representation of a relationship between the duty cycle and the normalized RMS input current, in accordance with an embodiment of the present invention.

FIG. 7 is a graphical representation 700 of a relationship between the duty cycle and the normalized RMS input current, in accordance with an embodiment of the present invention. The input RMS current can be calculated using the output current and $I_{RMs-CIN(NOM)}$ as in Formula 3.7:

$$I_{IN,RMS} = I_O \cdot K_{CM,IN}$$

Depending the duty cycle and the number of converter cells, $K_{CM,IN}$ can be found using FIG. 7. The minimum input capacitance required can be calculated from Formula 3.8:

$$C_{IN} = \frac{I_O \cdot K_{CM,IN}^2}{\Delta V_{C,IN} \cdot f_S}$$

Where $\Delta V_{C,IN}$ is the input voltage ripple contributed by the input capacitance.

In switching power supply power stages, the function of the input switches 502A-502D and second switches 504A-504D is to control the flow of energy from the input node Vin to the output node 518. The two types of MOSFET available for use are the n-channel and the p-channel. Other than selecting p-channel or n-channel, other parameters to consider while selecting the appropriate MOSFET are the maximum drain-to-source breakdown voltage, and the maximum drain current. The MOSFET selected should have a VBRDSS rating greater than the maximum input voltage, and some additional margin should be added for handling transients and spikes.

The MOSFET selected should also have an ID,MAX rating of at least two times the maximum power stage output current. The power dissipated in the upper and lower MOSFETs for each channel can be calculated using Formulas 2.8 and 2.9 which provide:

$$P_{LOSS,Q1} = I_O^2 \cdot R_{DS(ON),Q1} \cdot D +$$
$$\frac{1}{2}(V_{IN} \cdot I_O)(t_R + t_F)f_{SW} + Q_G \cdot V_{DD} \cdot f_{SW} + Q_{RR} \cdot V_{IN} \cdot f_{SW}$$

$$P_{LOSS,Q2} = I_O^2 \cdot R_{DS(ON),Q2} \cdot (1-D) +$$
$$\left(t_F \cdot V_F + t_R \frac{V_F + I_O \cdot R_{DS(ON),Q2}}{2}\right) I_O \cdot f_{SW} +$$
$$Q_G \cdot V_{DD} \cdot f_{SW} + t_{DEADTIME} \cdot f_{SW} \cdot V_F \cdot I_O$$

And noting that:

$$I_{O,PH} = \frac{I_O}{N}$$

A typical multiphase converter (e.g., multiphase converter 150 described above) has a output voltage ripple of about 15 mV peak to peak, an efficiency at full load of about 80%, a percent load regulation of about 1% and a percent line regulation of about 1%. For comparison, multiphase DC to DC converter with bypass capacitor 500 has a output voltage ripple of about 8.8 mV peak to peak, an efficiency at full load of about 80%, a percent load regulation of about 0.07% and a percent line regulation of about 0.00%. The completed power supply, including a power stage and a control circuit, meets a set of minimum performance requirements. This set of performance requirements is referred to as the power supply specification. The power supply specification can determine individual component requirements. Exemplary specifications include:

The power supply should remain in operation in a no-load condition: i.e. when the load is opened or the load is not drawing current at all.

The output voltage should not exceed 110% of the value of the maximum DC output voltage.

The main power source input voltage for the power supply is 12V±10% as is typically the case in real world applications.

This input voltage is supplied by a conventional power supply.

The output load regulation is less than about 2%.

The efficiency of the power supply should be at least 80% at the maximum output current and nominal input voltage.

The power supply should not dissipate more power under any load condition than it does at maximum output current and maximum input voltage.

The electrical specifications of the power supply define the design parameters such as input and output capacitors, output inductors, and power MOSFETs.

The number of converter cells 540A-540D is chosen to be 4 for a number of reasons. The choice of 4 converter cells 540A-540D may be most practical for a given circuit board size. If an output current of 40 A needs to be shared equally between phases, an even number of phases would make it easier for calculations. In terms of cost effectiveness, four converter cells seem to be an optimum solution. However it should be noted that the power supply is not limited to four converter cells as fewer or greater number of converter cells could be used. Further, the number of converter cells is not limited to being an even number. Odd numbers of converter cells could be used. The duty cycle for each converter cell can be approximated as:

$$D = \frac{V_O}{V_{IN}} = \frac{1\text{ V}}{12\text{ V}} = 0.0833$$

The selection of the LC filter values is significant as the LC filter values influence two parameters in the performance of the switching power supply. The output filter has a very strong influence on the overall stability of the switching system. Secondly, choosing a small inductance and large capacitance will result in good transient response due to load step changes. The minimum output inductance at the maximum phase output current can be calculated using Formula 3.3 with 10% inductor ripple current:

$$L_O = \frac{V_1}{\Delta I_L \cdot f_s} \cdot K_{CM} = \frac{(\approx 1\text{ V})}{(0.1 * 10A)(500\text{ kHz})} \cdot 0.67 = 1.34\text{ uH}$$

In addition to the inductance, other important factors to be considered when selecting the inductor are its maximum DC or peak current and maximum operating frequency. Using the inductor within its DC current rating ensures that the inductor does not overheat or saturate. Operating the inductor at less than its maximum frequency rating ensures that the maximum core loss is not exceeded, thereby further preventing overheating or saturation.

Magnetic component manufacturers offer a wide range of off-the-shelf inductors suitable for DC to DC converters, some of which are surface mountable. There are many types of inductors available. The most popular core materials are ferrites and powdered iron. Bobbin or rod-core inductors are readily available and inexpensive. Care must be exercised in using bobbin or rod-core inductors due to the likelihood of noise problems than are other shapes. Custom designs are also feasible, provided the volumes are sufficiently high. In an exemplary embodiment, a MLC 1260-172ML inductor from Coilcraft with 1.75 uR and DCR of 2.84 mΩ was used. A smaller inductance value could have been used due to of the ripple cancellation factor in the multiphase buck compared to a single phase. KCM is 0.67, obtained from FIG. 1J using the duty cycle value of 0.083 and 4 converter cells.

$$\Delta I_L = \frac{V_1}{L_O f_S} \cdot \frac{(N \cdot D - m + 1)(m - N \cdot D)}{N \cdot D} =$$

$$\frac{V_1}{L_O f_S} \cdot K_{CM} = \frac{(\sim 1\text{ V})}{(1.75\text{ uH})(500\text{ kHz})} \cdot 67 = 1.14A$$

$$C_{O,\text{MIN}} = \frac{I_{PP}}{8 \cdot f_s \cdot \Delta V_O} = \frac{1.14A}{8(500\text{ kHz})(50\text{ mV})} = 5.7\text{ uF}$$

$$ESR \le \frac{\Delta V_O}{I_{pp}} \Rightarrow ESR \le \frac{50\text{ mV}}{1.14A} \Rightarrow ESR \le 44\text{ m}\Omega$$

Ripple current flowing through a capacitor's ESR causes power dissipation in the capacitor. This power dissipation causes a temperature increase internal to the capacitor. Excessive temperature can significantly reduce the service life of a capacitor. Capacitors have ripple current ratings that are dependent on ambient temperature and should not be exceeded.

Three capacitor technologies-low-impedance aluminum, organic semiconductor, and solid tantalum-are suitable for low-cost commercial applications. Low-impedance aluminum electrolytic capacitors are the lowest cost and offer high capacitance in small packages, but ESR is higher than those of the other two types. Organic semiconductor electrolytic capacitors, such as the Sanyo OS-CON series, have become very popular for the power supply industry in recent years. Organic semiconductor electrolytic capacitors a low ESR that is stable over the temperature range and high capacitance in a small package. Most of the organic semiconductor electrolytic capacitors are supplied in lead-mounted radial packages.

Surface mount devices are available but much of the size and performance advantage is sacrificed. Solid tantalum chip capacitors may be used if a surface mounted device is an absolute must. Products such as the AVX TPS family and the Sprague 593D family were developed for power-supply applications. These products offer a low ESR that is relatively stable over the temperature range, high ripple-current capability, low ESL, surge-current testing, and a high ratio of capacitance to volume.

The minimum output capacitance required to keep the output voltage ripple at 50 mV is 5.7 uF with ESR limitation of 44 mΩ. To accommodate low ESR, the capacitors are placed in parallel so that the equivalent capacitance is larger while the equivalent resistance gets smaller. It should be noted that the transient voltage overshoot given from the transition of no load to full load current should also be considered.

The input capacitor 508A, 508B sustains the ripple current produced during the on time of the input switches 502A-502D, therefore the input capacitor has a low ESR to minimize the losses. The input capacitor 508A, 508B should also be able to handle the input RMS current $I_{IN,RMS}$:

$$I_{IN,RMS} = I_O \cdot K_{CM,IN} = (10A)(.12) = 1.2A$$

$$C_{IN} = I_O \cdot \frac{K_{CM,IN}^2}{\Delta V_{C,IN} \cdot f_s} = \frac{(10A)(0.12)^2}{(100\text{ mV})(500\text{ kHz})} = 2.88\text{ uF}$$

$$ESR \le \frac{\Delta V_{C,IN}}{I_{pp}} \Rightarrow ESR \le \frac{100\text{ mV}}{1.2A} \Rightarrow ESR \le 83\text{ m}\Omega$$

In an exemplary embodiment, International Rectifier's Fetky MOSFET and Schottky Rectifier IRL3103D1 is selected as the MOSFETs. This device is chosen for its low $RD_{S(ON)}$ of 14 mΩ and drain-to-source breakdown voltage rating of 30V. In addition, its continuous drain current $I_D$ is 64 A. Packaging a power MOSFET with Schottky diode together minimizes the interconnection inductance and resistance. It should be noted that other MOSFETs or other transistor switching type devices could be used.

The gate control signals of the input switches 502A-502D in each converter cell 540A-540D are applied to the respective control nodes 539A-539D from the controller 242. The gate control signals of the input switches 502A-502D are out-of-phase by 360°/N, where N is the number of converter cells. In the multiphase DC to DC converter with bypass capacitor 500 of FIG. 5, there are 4 converter cells 540A-540D, therefore all four input switch control signals are out of phase by 90°. As a result, ripple cancellation in the current output of each converter cell 540A-540D, producing a much smaller ripple in the output current of the converter. Frequency multiplication occurs as well in this topology both at its input and output currents. More specifically, if a switching frequency $f_s$ is applied to the multiphase DC to DC converter with bypass capacitor 500, then both input and output current have their fundamental noise component at N-times $f_s$. For the converter cell multiphase DC to DC converter with bypass capacitor 500, this would be 4*$f_s$. This allows in reduced component sizes thereby giving a more compact circuit board. Equally important is that the frequency multiplication property helps improve load transient which implies a faster system.

Figure 8:
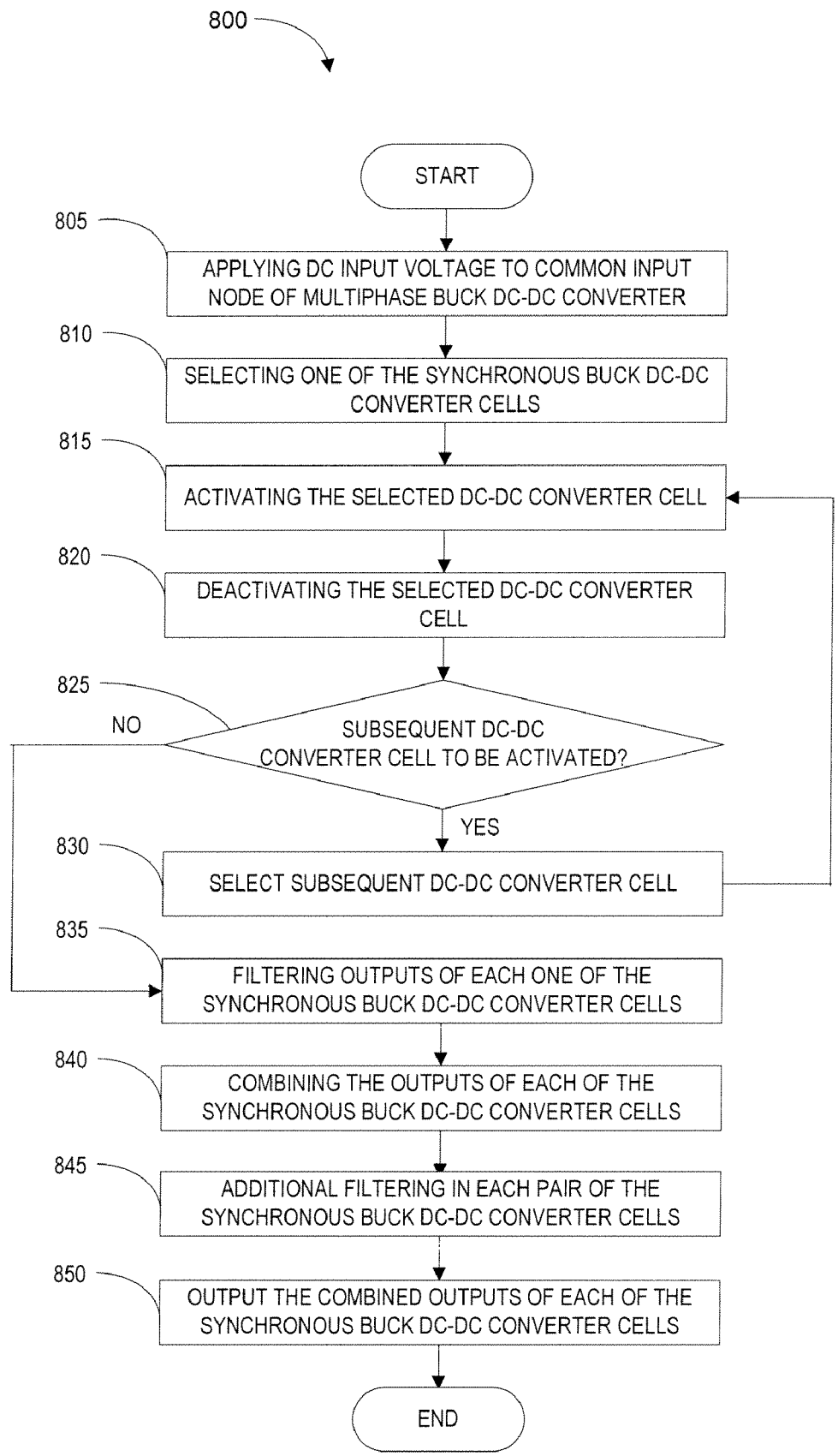
FIG. 8 is a flowchart diagram that illustrates the method operations performed in reducing a DC input voltage, in accordance with one embodiment of the present invention.

FIG. 8 is a flowchart diagram that illustrates the method operations 800 performed in reducing a DC input voltage, in accordance with one embodiment of the present invention. In an operation 805, a DC input voltage is applied to a common input node of a multiphase buck DC to DC converter. The multiphase buck DC to DC converter 500 is described in more detail in FIG. 5 above.

The plurality synchronous buck DC to DC converter cells are sequentially activated as described in operations 810-830 as follows. In operation 810, one of the DC to DC converter cells is selected. In operation 815, the selected DC to DC converter cell is activated. In operation 820, the selected DC to DC converter cell is deactivated.

In operation 825, the DC to DC converter cells are analyzed to determine if additional converter cells are available to be activated. If additional DC to DC converter cells are available to be activated, then in operation 830, a subsequent one of the DC to DC converter cells is selected and the method operations continue in operations 815-825 above.

In operation 835, the outputs of each of the activated DC to DC converter cells are filtered. Filtering the output of each one of the DC to DC converter cells is performed in the LC tank formed by the corresponding one of the output inductors and the capacitor connected between the common input node and the corresponding bypass node.

In an operation 840, the filtered output of each pair of the activated DC to DC converter cells is further filtered through an auxiliary inductor. In an optional operation 845, the filtered output of each pair of the activated DC to DC converter cells is additionally filtered through an additional inductor and an additional capacitor. The additional inductor is coupled between the second switch and a ground potential and the additional capacitor is coupled between the second switch and the corresponding one of a plurality of pair output nodes. In operation 850, the filtered, combined output of the activated DC to DC converter cells is output at the common output node (e.g., node 518 in FIG. 5 above).

It will be further appreciated that the instructions represented by the operations in the above figures are not required to be performed in the order illustrated, and that all the processing represented by the operations may not be necessary to practice the invention. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A multiphase buck DC to DC converter comprising:
a plurality of synchronous buck DC to DC converter cells, each one of the plurality of synchronous buck DC to DC converter cells having an input node, an output node and a control node, the plurality of synchronous buck DC to DC converter cells being arranged in a parallel configuration including having the input nodes of each one of the plurality of synchronous buck DC to DC converter cells connected together at a common input node, the plurality of synchronous buck DC to DC converter cells being arranged in a plurality of pairs of synchronous buck DC to DC converter cells wherein the output nodes of each one of the plurality of pairs of the synchronous buck DC to DC converter cells are connected to corresponding one of a plurality of pair output nodes, wherein each one of the plurality of pairs of the synchronous buck DC to DC converter cells include:
a capacitor connected between the common input node and the corresponding pair output node; and
a corresponding one of a plurality of output inductors connected between the corresponding pair output node and a common output node.

2. The multiphase buck DC to DC converter of claim 1, wherein each one of the plurality of synchronous buck DC to DC converter cells includes:
an input switch having a first voltage source input node, a input switch control node and an input switch output node;
a converter cell inductor having a first end and a second end, wherein the first end of the converter cell inductor is connected to the input switch output node and the second end of the converter cell inductor is connected to the output nodes of the synchronous buck DC to DC converter cell;
a second switch having a second voltage source input node, a second switch control node and a second switch output node, the second switch output node connected to the input switch output node, the input switch output node and the second switch control node coupled to a corresponding control input of the synchronous buck DC to DC converter cell.

3. The multiphase buck DC to DC converter of claim 1, further comprising a controller having a corresponding one of a plurality of control outputs coupled to a corresponding control input of each of the plurality of synchronous buck DC to DC converter cells.

4. The multiphase buck DC to DC converter of claim 3, wherein the controller includes logic for sequentially activating each one of the plurality synchronous buck DC to DC converter cells.

5. The multiphase buck DC to DC converter of claim 3, wherein the controller includes a feedback signal input from the output of the multiphase buck DC to DC converter.

6. A method of reducing a DC input voltage comprising:
applying the DC input voltage to a common input node of a multiphase buck DC to DC converter including:
a plurality of synchronous buck DC to DC converter cells, each one of the plurality of synchronous buck DC to DC converter cells having an input node, an output node and a control node, the plurality of synchronous buck DC to DC converter cells being arranged in a parallel configuration including having the input nodes of each one of the plurality of synchronous buck DC to DC converter cells connected together at the common input node, the plurality of synchronous buck DC to DC converter cells being arranged in a plurality of pairs of synchronous buck DC to DC converter cells wherein the output nodes of each one of the plurality of pairs of the synchronous buck DC to DC converter cells are connected to corresponding one of a plurality of pair output nodes, wherein each one of the plurality of pairs of the synchronous buck DC to DC converter cells include:
a capacitor connected between the common input node and the corresponding pair output node; and
a corresponding one of a plurality of output inductors connected
between the corresponding pair output node and a common output node
sequentially activating each one of the plurality synchronous buck DC to DC converter cells including deactivating a previous one of the plurality synchronous buck DC to DC converter cells before activating a subsequent one of the plurality synchronous buck DC to DC converter cells;
filtering an output of each one of the plurality synchronous buck DC to DC converter cells in an LC tank formed by the corresponding one of a plurality of output inductors and the capacitor connected between the common input node and the corresponding pair output node;
combining the outputs of each one of the plurality synchronous buck DC to DC converter cells at the common output node.

7. A multiphase buck DC to DC converter with a bypass capacitor comprising:
a plurality of synchronous buck DC to DC converter cells, each one of the plurality of synchronous buck DC to DC converter cells having an input node, a converter cell output node and a control node, the plurality of synchronous buck DC to DC converter cells being arranged in a parallel configuration including having the input nodes of each one of the plurality of synchronous buck DC to DC converter cells connected together at a common input node, the plurality of synchronous buck DC to DC converter cells being arranged in a plurality of pairs of synchronous buck DC to DC converter cells wherein the output nodes of each one of the plurality of pairs of the synchronous buck DC to DC converter cells are connected to corresponding one of a plurality of pair output nodes, wherein each one of the plurality of pairs of the synchronous buck DC to DC converter cells include:
a bypass inductor coupled between the corresponding one of a plurality of pair output nodes and a corresponding one of a plurality of bypass nodes
a bypass capacitor connected between the common input node and the corresponding one of a plurality of bypass nodes; and
an auxiliary inductor coupled between the corresponding one of a plurality of bypass nodes and a common output node.

8. The multiphase buck DC to DC converter of claim 7, wherein each one of the plurality of pairs of synchronous buck DC to DC converter cells further includes an additional inductor coupled between the second switch and a ground potential and an additional capacitor coupled between the second switch and the corresponding one of a plurality of pair output nodes.

9. The multiphase buck DC to DC converter of claim 7, further comprising a controller having a corresponding one of a plurality of control outputs coupled to a corresponding control input of each of the plurality of synchronous buck DC to DC converter cells.

10. The multiphase buck DC to DC converter of claim 9, wherein the controller includes logic for sequentially activating each one of the plurality synchronous buck DC to DC converter cells.

11. A method of reducing a DC input voltage comprising:
applying the DC input voltage to a common input node of a multiphase buck DC to DC converter with a bypass filter including:
- a plurality of synchronous buck DC to DC converter cells, each one of the plurality of synchronous buck DC to DC converter cells having an input node, a converter cell output node and a control node, the plurality of synchronous buck DC to DC converter cells being arranged in a parallel configuration including having the input nodes of each one of the plurality of synchronous buck DC to DC converter cells connected together at a common input node, the plurality of synchronous buck DC to DC converter cells being arranged in a plurality of pairs of synchronous buck DC to DC converter cells wherein the output nodes of each one of the plurality of pairs of the synchronous buck DC to DC converter cells are connected to corresponding one of a plurality of pair output nodes, wherein each one of the plurality of pairs of the synchronous buck DC to DC converter cells include:
  - a bypass inductor coupled between the corresponding one of a plurality of pair output nodes and a corresponding one of a plurality of bypass nodes;
  - a bypass capacitor connected between the common input node and the corresponding one of a plurality of bypass nodes; and
  - an auxiliary inductor coupled between the corresponding one of a plurality of bypass nodes and a common output node;

sequentially activating each one of the plurality synchronous buck DC to DC converter cells including deactivating a previous one of the plurality synchronous buck DC to DC converter cells before activating a subsequent one of the plurality synchronous buck DC to DC converter cells;

filtering an output of each one of the plurality synchronous buck DC to DC converter cells in an LC tank formed by the corresponding one of a plurality of output inductors and the capacitor connected between the common input node and the corresponding bypass node;

combining the outputs of each one of the plurality synchronous buck DC to DC converter cells at the common output node.

* * * * *